United States Patent
Naito et al.

(10) Patent No.: US 6,771,832 B1
(45) Date of Patent: Aug. 3, 2004

(54) IMAGE PROCESSOR FOR PROCESSING AN IMAGE WITH AN ERROR DIFFUSION PROCESS AND IMAGE PROCESSING METHOD FOR PROCESSING AN IMAGE WITH AN ERROR DIFFUSION PROCESS

(75) Inventors: Yoshikazu Naito, Yokohama (JP); Shinichi Sato, Yokohama (JP); Fumiko Koshimizu, Machida (JP)

(73) Assignee: Panasonic Communications Co., Ltd., Tokyo (JP)

( * ) Notice: Subject to any disclaimer, the term of this patent is extended or adjusted under 35 U.S.C. 154(b) by 687 days.

(21) Appl. No.: 09/615,908

(22) Filed: Jul. 13, 2000

Related U.S. Application Data

(63) Continuation-in-part of application No. 09/044,150, filed on Mar. 19, 1998.

(30) Foreign Application Priority Data

Jul. 29, 1997 (JP) .............................................. 9-218004

(51) Int. Cl.[7] .............................................. G06K 9/36
(52) U.S. Cl. ...................... 382/252; 382/275; 358/3.05; 345/616
(58) Field of Search .................................. 382/162, 168, 382/237, 252, 275; 358/3.03–3.05; 345/616

(56) References Cited

U.S. PATENT DOCUMENTS

| | | | |
|---|---|---|---|
| 4,783,839 A | 11/1988 | Bamber | |
| 5,140,432 A | * 8/1992 | Chan | 358/3.03 |
| 5,260,810 A | 11/1993 | Kanno et al. | |
| 5,307,426 A | * 4/1994 | Kanno et al. | 382/252 |
| 5,394,250 A | 2/1995 | Shono | |
| 5,532,827 A | 7/1996 | Kajitani et al. | |
| 5,621,825 A | 4/1997 | Masaki et al. | |
| 5,737,453 A | * 4/1998 | Ostromoukhov | 382/275 |
| 5,757,517 A | * 5/1998 | Couwenhoven et al. | 358/463 |
| 5,757,976 A | 5/1998 | Shu | |
| 5,790,704 A | 8/1998 | Rao et al. | |
| 6,002,811 A | 12/1999 | Koshimizu et al. | |
| 6,008,912 A | 12/1999 | Sato et al. | |

* cited by examiner

*Primary Examiner*—Amelia M. Au
*Assistant Examiner*—Chong Kim
(74) *Attorney, Agent, or Firm*—Greenblum & Bernstein, P.L.C.

(57) ABSTRACT

Error addition section 201 generates correction data by adding correction value Emo and correction value E1 to the input data. Binary processing section 202 converts the correction data to binary data to generate output data. Binary error calculation section 203 calculates binary error E based on the correction data and output data. Propagation coefficient judgment section 204 judges propagation coefficients K1 to K4. Propagation error operation section 205 operates on binary error E and propagation coefficients K1 to K4 to calculate correction value E1 and correction value Emi. Error memory 206 temporarily stores correction value Emi, and outputs it to error addition section 201 when the pixel data to be corrected is input.

15 Claims, 22 Drawing Sheets

PRIOR ART

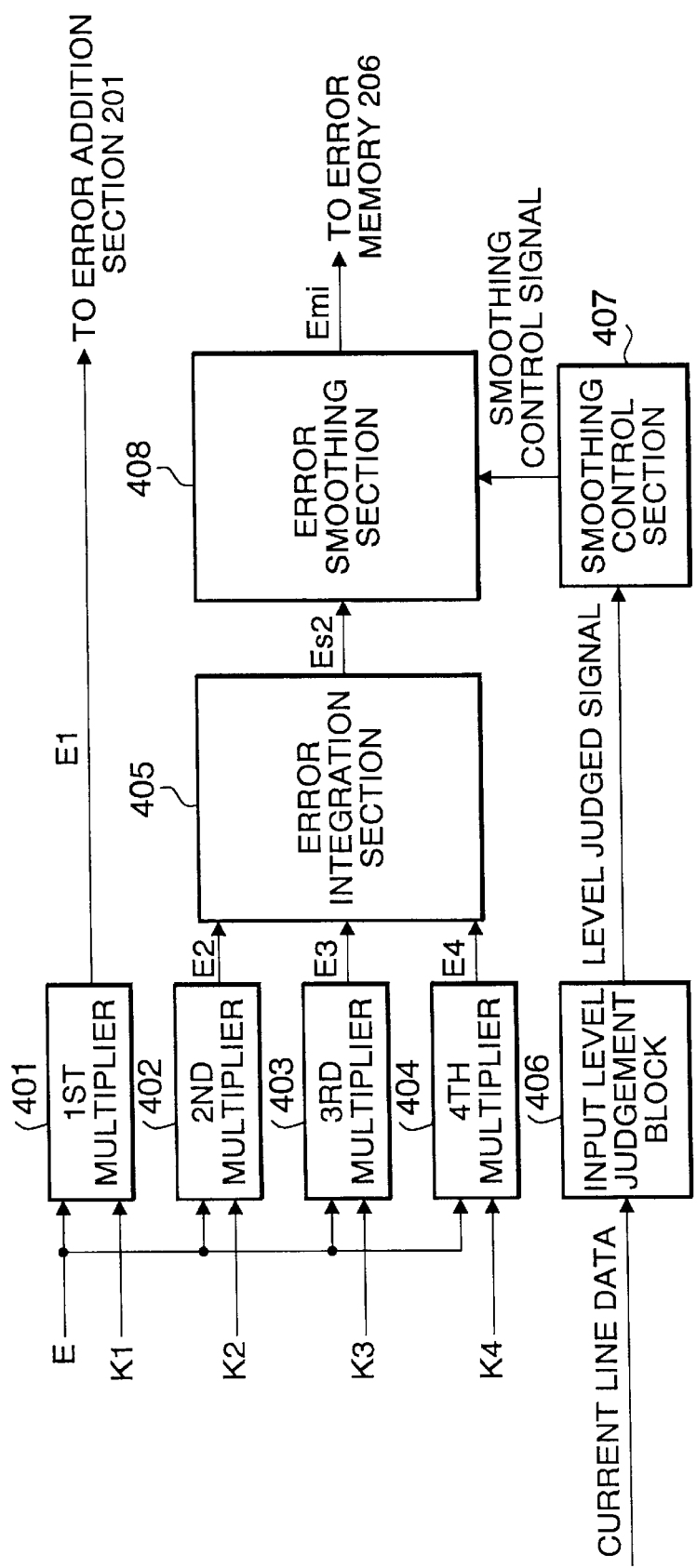

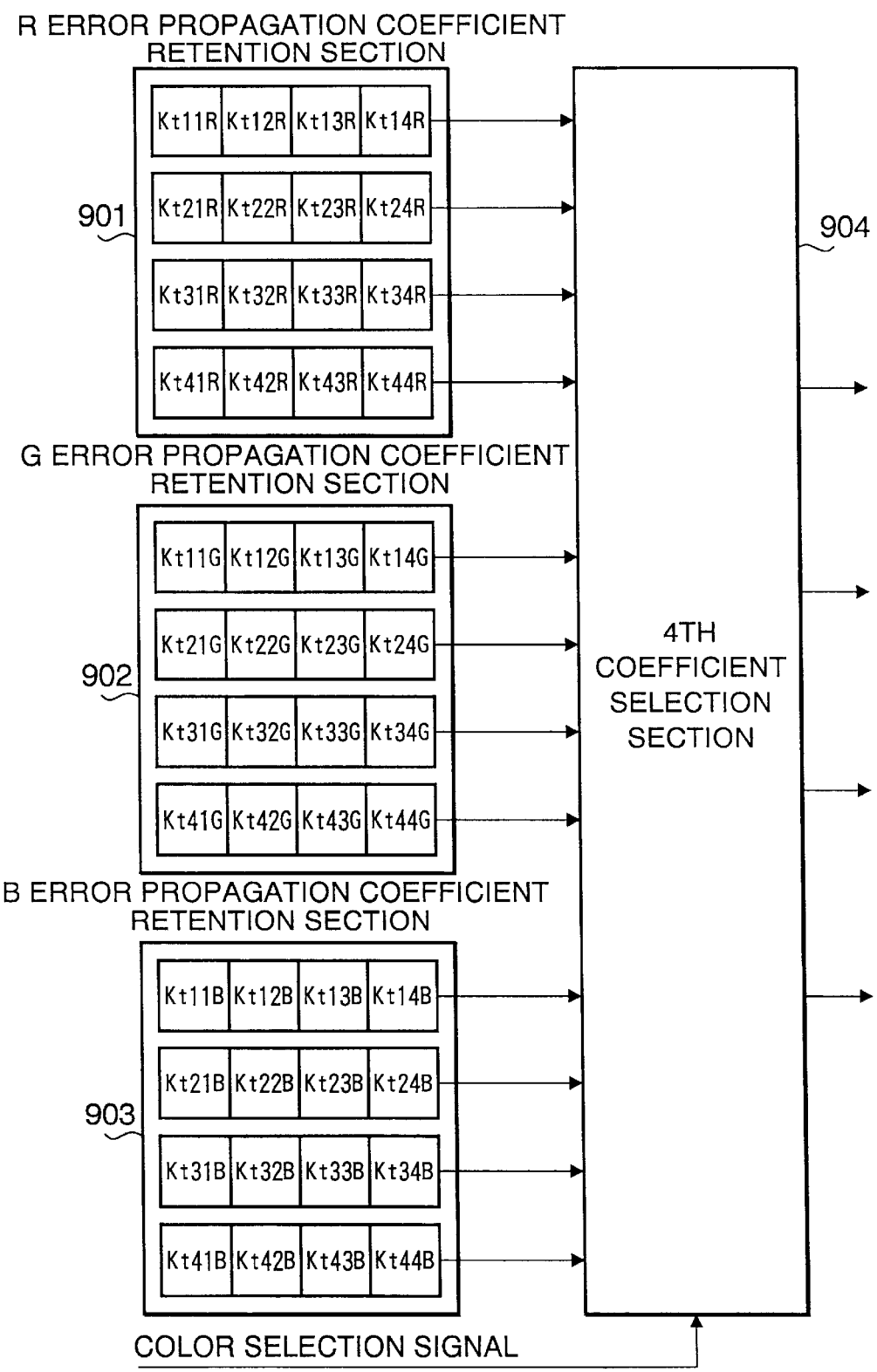

WITHOUT DOT DELAY PROCESSING

DOT DELAY PROCESSING Kv=0/64

DOT DELAY PROCESSING Kv=25/64

DOT DELAY PROCESSING Kv=50/64

DOT DELAY PROCESSING Kv=64/64

WITHOUT DOT DELAY PROCESSING

DOT DELAY PROCESSING Kv=50/64
ALSO APPLIED TO EDGES
(UPSIDE, LEFTSIDE)

IMAGE PROCESSOR FOR PROCESSING AN IMAGE WITH AN ERROR DIFFUSION PROCESS AND IMAGE PROCESSING METHOD FOR PROCESSING AN IMAGE WITH AN ERROR DIFFUSION PROCESS

This is a Continuation-in-part of application Ser. No. 09/044,150 filed Mar. 19, 1998.

BACKGROUND OF THE INVENTION

1. Field of the Invention

The present invention relates to image processors used for facsimile, etc.

2. Description of the Related Art

As shown in FIG. 1, a conventional image processor includes input terminal 1 for data input, adder 2 which adds 2 data items, threshold generator 3 which generates a threshold used as a reference for binary processing, comparator 4 which converts multi-level data to binary data, output terminal 5 which outputs the binary data, subtracter 6 which subtracts between 2 data items, error memory 7 which stores calculated errors, and error filter 8 which calculates correction values.

Input terminal 1 inputs data resulting from a document which is resolved into pixels by a scanner, etc., then converted to multi-level image signals. Adder 2 adds a correction value output from error filter 8 to multi-level data (hereinafter referred to as "input data") of the target pixel input from input terminal 1 to generate correction data, and outputs it to comparator 4 and subtracter 6. Comparator 4 generates output data by converting the correction data to binary data based on the threshold generated from threshold generator 3, outputs it to other devices via output terminal 5, and at the same time outputs it to subtracter 6. Subtracter 6 subtracts the output data from the correction data and stores the subtraction result in error memory 7 as an error. Error filter 8 generates a correction value by adding binary errors E(a) to E(d) of peripheral pixels "a" to "d" around target pixel "p" stored in error memory 7, each weighted with certain percentage, and outputs the correction value to adder 2.

The operation of the conventional image processor above is described below.

First, in adder 2, the correction value is added to the input data to generate correction data, and is output to comparator 4 and subtracter 6. Then, in comparator 4, the correction data is converted to binary data based on the threshold generated from threshold generator 3 to generate output data, and the data is output to other devices via output terminal 5, and at the same time output to subtracter 6. Then in subtracter 6, the output data is subtracted from the correction data, and thereby a binary error of the target pixel is calculated, and stored in error memory 7. The binary error stored in error memory 7 is weighted with the certain percentage in error filter 8 to generate a correction value, and the correction value is output to subtracter 2.

As describe above, the conventional image processor intends to improve the image quality by diffusing toward peripheral pixels binary errors which are obtained by subtracting the output data from the correction data which is a sum of the input data and correction value.

However, since the conventional image processor above keeps always fixed weighting percentage of binary errors, it has the problem of generating texture patterns peculiar to error diffusion on images with less concentration variations, degrading the gradation characteristic and resolution.

Further, since the conventional image processor above has propagation errors which vary drastically at areas where black and white points change drastically, the output data of the target pixel is affected by previous errors, producing the problem of white missing or black crushing as well.

SUMMARY OF THE INVENTION

It is a first object of the present invention to provide an image processor which suppresses generation of texture patterns peculiar to error diffusion, and thereby is in gradation characteristic and resolution.

The present invention achieves the above object by maintaining a plurality of coefficient candidates, selecting a propagation coefficient from said coefficient candidates according to the input data, and propagating to peripheral pixels a value obtained by multiplying the binary errors by said propagation coefficient.

It is a second object of the present invention to provide an image processor which suppresses generation of white missing or black crushing at areas where black and white points change drastically.

The present invention achieves the above object by controlling the propagation coefficient based on whether the variation between the input data of the target pixel and the input data of the pixel where binary errors are propagated is greater than a reference value or not.

It is a third object of the present invention to provide an image processor which reduces overlapping dots between different colors, and thereby handles color images with excellent color reproducibility.

The present invention achieves the above object by maintaining a plurality of coefficient candidates for each color, selecting a propagation coefficient from the coefficient candidates corresponding to the color of the target pixel, and propagating to peripheral pixels a value obtained by multiplying the binary errors by said propagation coefficient.

Further the present invention achieves the above object by using an alternative error that does not depend on a propagation error from the target pixel, as the propagation error in an error propagation direction, when a pixel variation is larger than a reference value in the error propagation direction.

BRIEF DESCRIPTION OF THE DRAWINGS

FIG. 4 is a block diagram illustrating a configuration of a propagation error operation section;

FIG. 9 is a block diagram showing a coefficient retention status in the case of processing a color image;

DETAILED DESCRIPTION OF THE PREFERRED EMBODIMENTS

Embodiments of the present invention are described below with reference to the attached drawings.

(Embodiment 1)

Figure 1:
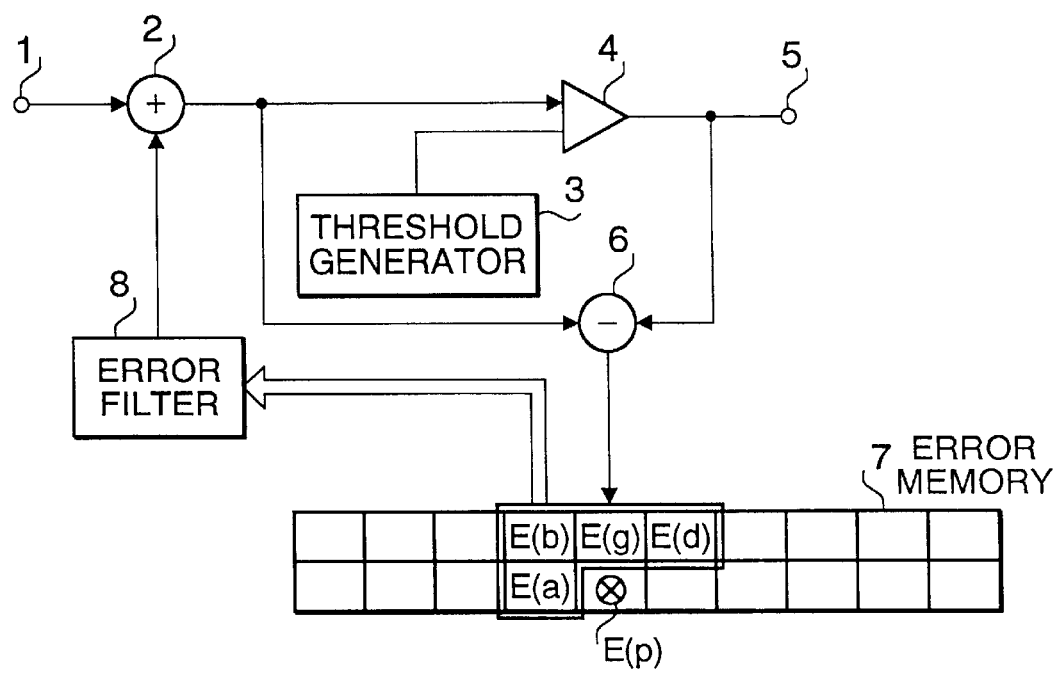
FIG. 1 is a block diagram illustrating an entire configuration of a conventional image processor.
Figure 2:
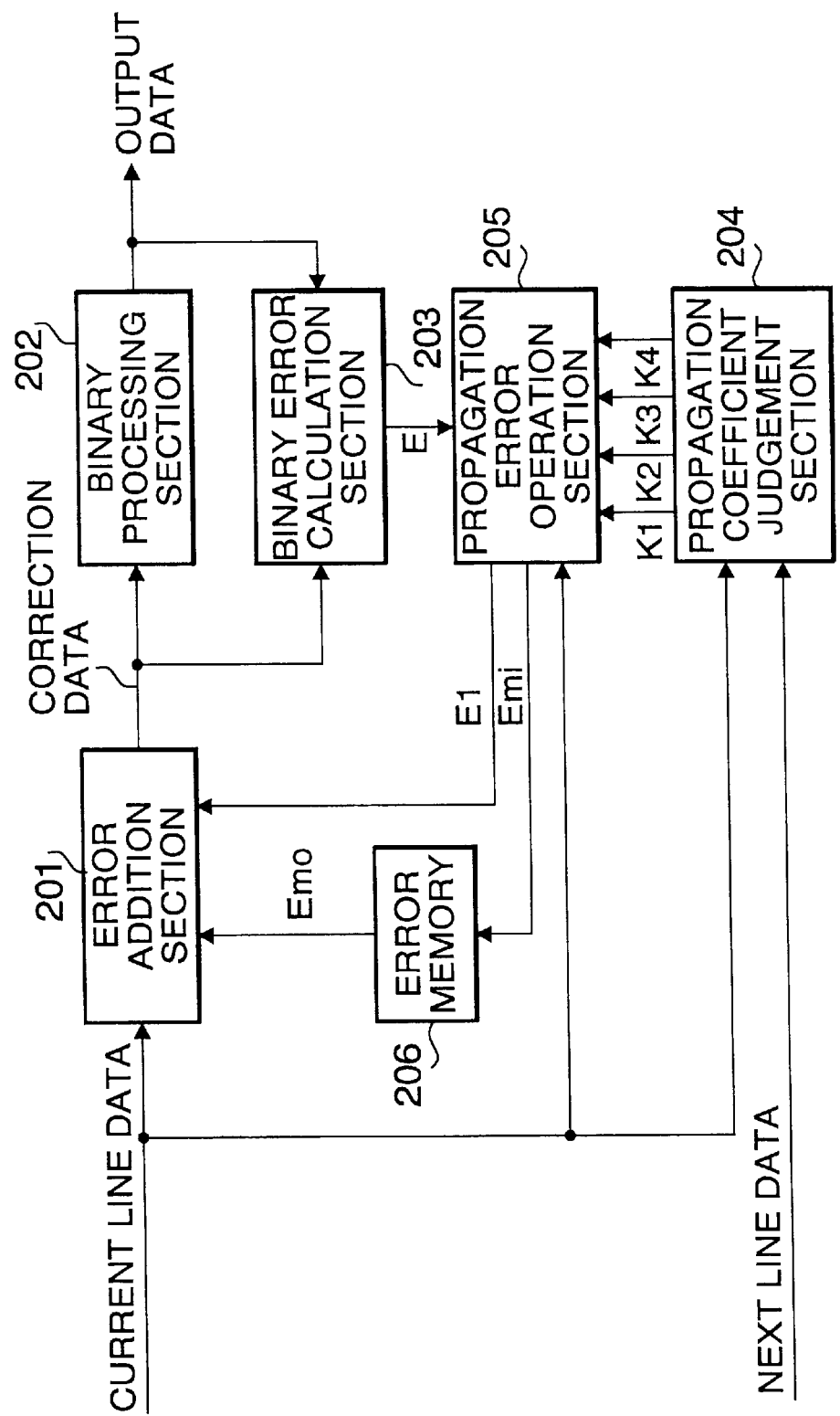
FIG. 2 is a block diagram illustrating an entire configuration of an image processor of the present invention.

FIG. 2 is a block diagram illustrating an entire configuration of an image processor in an Embodiment 1. In FIG. 2, error addition section 201 adds correction value Emo propagated from the previous line peripheral pixels and correction value E1 propagated from the previous pixel to the multi-level data of the input target pixel (hereinafter referred to as "input data") to generate correction data, and outputs the generated data to binary processing section 202 and binary error calculation section 203.

Binary processing section 202 converts correction data to binary data to generate output data, and outputs the binary processed correction data to binary error calculation section 203, while concurrently outputting to other devices. Binary error calculation section 203 calculates binary error E from the correction data and the binary processed correction data output to propagation error operation section 205. Propagation coefficient judgment section 204 determines propagation coefficients K1 to K4 from the current line data and next line data output to propagation error operation section 205.

Propagation error operation section 205 operates on binary error E and propagation coefficients K1 to K4 to calculate correction value E1 to be propagated to the next pixel and correction value Emi to be propagated to the next line peripheral pixels, and outputs correction value E1 and correction value Emi to error addition section 201 and error memory 206, respectively. Error memory 206 temporarily stores correction value Emi, and outputs it to error addition section 201 when the pixel data to be corrected is input.

Figure 3:
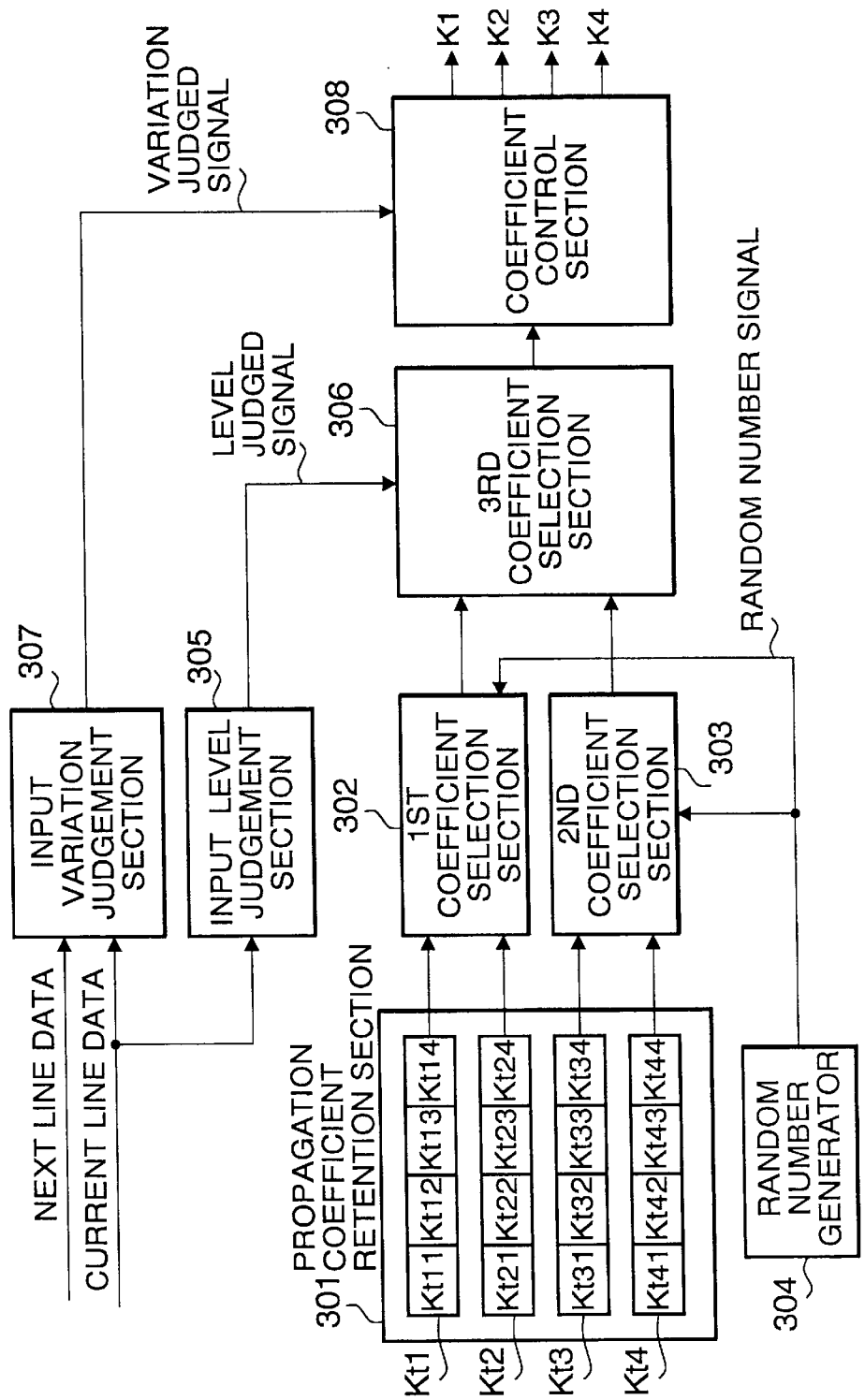
FIG. 3 is a block diagram illustrating a configuration of a propagation coefficient judgment block.

Then, propagation coefficient judgment section 204 above is explained with reference to FIG. 3.

Propagation coefficient retention section 301 retains a plurality of propagation coefficient groups Kt1 to Kt4. Propagation coefficients are set to take values which will minimizes generation of texture patterns according to each input data. In the Embodiment 1, propagation coefficient groups are formed in a set of four, and although it is explained that propagation coefficient retention section 301 retains 4 propagation coefficient groups, the present invention is not limited thereto.

First coefficient selection section 302 selects either propagation coefficient group Kt1 or Kt2 based on a random number signal generated by random number generator 304. Similarly, second coefficient selection section 303 selects either propagation coefficient group Kt3 or Kt4. Since in the Embodiment 1, first coefficient selection section 302 and second coefficient selection section 303 select propagation coefficient groups alternatively, random number generator 304 only needs to generate "0"s or "1"s as random number signals.

Input level judgment section 305 judges whether the input data of the target pixel is greater than preset level reference value Lv1 or not and outputs the judgment result to third coefficient selection section 306 as a level judged signal. Level reference value Lv1 is the value indicating the data generated by highlighted textures, and as the value, a value which produces texture patterns less frequently is selected after executing error diffusion with various error diffusion coefficients.

Third coefficient selection section 306 refers to the level judged signal, and when the input data of the target pixel is greater than level reference value Lv1, selects first coefficient selection section 302, otherwise selects second coefficient selection section 303.

Selecting the optimal propagation coefficient according to the input data can suppress generation of texture patterns peculiar to error diffusion processing and achieve high quality images. Further, selecting a propagation coefficient using random numbers can effectively suppress generation of texture patterns.

Input variation judgment section 307 compares the absolute value (hereinafter referred to as "data variation") of the difference between the input data of the target pixel and the input data of the pixel to which the propagation error of the target pixel is propagated (hereinafter referred to as "propagated pixel") with variation reference value Lc. In the case where the data variation is greater than variation reference value Lc, and at the same time the binary error of the target pixel and the binary error of the propagated pixel differ in polarity, input variation judgment section 307 judges that black and white points change drastically, and in other cases, the section 307 judges that black and white points do not vary drastically. Then the section 307 outputs the judgment result to coefficient control section 308 as a variation judged signal.

For example, in the case of 256-gradation, binary threshold of 128 and variation reference value of 64, when the input data of the target pixel is 80, the binary output data is 0 and the binary error is +80. On the other hand, when the input data of the propagated pixel is 155, the binary output data is 255 and the binary error is −100. Therefore, the data variation is 75 which is greater than the variation reference value of 64. In addition, the binary errors are +80 and −100, which means they are different in polarity. In this case, there is a drastic change from black to white points.

Here, variation reference value Lc can arbitrarily be set by means of the register coefficient configuration. For example, in the case of 256-gradation, supposing that the judgment reference value is 64, if the difference between the input data of the target pixel and the input data of the peripheral pixels is at least ¼ of the gradation, it is assumed that there is a drastic black/white variation.

Coefficient control section 308 sets the propagation coefficient group selected by third coefficient selection section 306 as propagation coefficients K1 to K4 when it is judged that there is no drastic black/white variation, and sets "0" when it is judged that there is a drastic black and white variation. Then propagation coefficients K1 to K4 are output to propagation error operation section 205.

This will prevent white missing and black crushing at areas where there is a drastic variation between the input data of the target pixel and the input data of the propagated pixel.

This is explained below taking an example of 256-gradation, binary threshold of 128, with the propagation coefficient propagated to the pixel to the right of the target pixel set to "1".

First, when the input data of the processing start pixel is "0" followed by a pixel whose input data is 254, the propagation error propagated from the processing start pixel to the pixel on the right side is "0", and the correction value at that pixel is (propagation error)×(propagation coefficient)=0×1. The propagation error propagated from the pixel is "−1", and the propagation error and correction value are cumulatively added by "−1" thereafter. As a result, a black point appears at the processing start pixel, followed by white points consecutively and another black point appears when the correction value reaches "−127".

However, when the input data of the processing start pixel is "127" followed by a pixel whose input data is 254, the propagation error propagated from the processing start pixel to the pixel on the right side is "+127", and when the propagation error continues to be used, the correction value becomes (propagation error)×(propagation coefficient)= 127×1. The propagation error propagated from that pixel is "127−1", and the propagation error and correction value are cumulatively added by "−1" thereafter. As a result, a black point appears in the processing start pixel, followed by 127 white points with a positive correction value consecutively and the correction value becomes "0", and another black point appears when the correction value reaches "−127". Thus white missing occurs at the right of the start pixel.

Therefore, white missing is prevented by setting the propagation coefficient to "0" at areas where there is a drastic variation in the input data between the target pixel and propagated pixel to stop error propagation.

Then, propagation error operation section 205 above is explained with reference to FIG. 4.

First multiplier 401 to fourth multiplier 404 multiply propagation coefficients K1 to K4 input from propagation coefficient judgment section 204 by binary error E input from binary error calculation section 203 to calculate propagation errors E1 to E4 propagated to peripheral pixels, respectively. first multiplier 401 outputs calculated propagation error E1 to error addition section 201.

Error integration section 405 integrates propagation errors E2 to E4 calculated by second multiplier 402 to fourth multiplier 404 to generate accumulated error Es2 and outputs it to error smoothing section 408. Input level judgment section 406 judges whether the input data of the next pixel on the right side of the target pixel is greater than preset level reference value Lv2 or not and outputs the judgment result to smoothing control section 407 as a level judged signal.

Smoothing control section 407 stores the level judged signals corresponding to the target pixel and the pixels on both sides of the target pixel, and generates a smoothing control signal from the level judged signals to output to error smoothing section 408. Error smoothing section 408 performs the smoothing processing described later on accumulated error Es2 using the smoothing control signal, and thereby generates correction value Emi to output to error memory 206.

Then, the operation of propagation coefficient judgment section 204 in the image processor in the Embodiment 1 is explained with reference to the flow chart illustrated in FIG. 5.

First, based on the random number signal output from random number generator 304, either of propagation coefficient group Kt1 or propagation coefficient group Kt2 stored in propagation coefficient retention section 301 is output to first coefficient selection section 302. Similarly, either of propagation coefficient group Kt3 or propagation coefficient group Kt4 is output to second coefficient selection section 303.

Then, input level judgment section 305 judges whether the input data is greater than preset level reference value Lv1 or not, and outputs the judgment result to third coefficient selection section 306 as a level judged signal. When the input data is greater than reference data Lv in third coefficient selection section 306, the selection result of first coefficient selection section 302 is selected, and when smaller, the selection result of second coefficient selection section 303 is selected.

On the other hand, input variation judgment section 307 judges the presence or absence of black/white changes based on the variation between the input data of the target pixel and the input data of the propagated pixel, and outputs the judgment result to coefficient control section 308 as a variation judged signal.

When there is no black/white change, coefficient control section 308 sets the propagation coefficient group input from third coefficient selection section 306 as propagation coefficients K1 to K4, and when there is any black/white change, "0" is set. Propagation coefficients K1 to K4 are output to propagation error operation section 205.

Figure 6A:
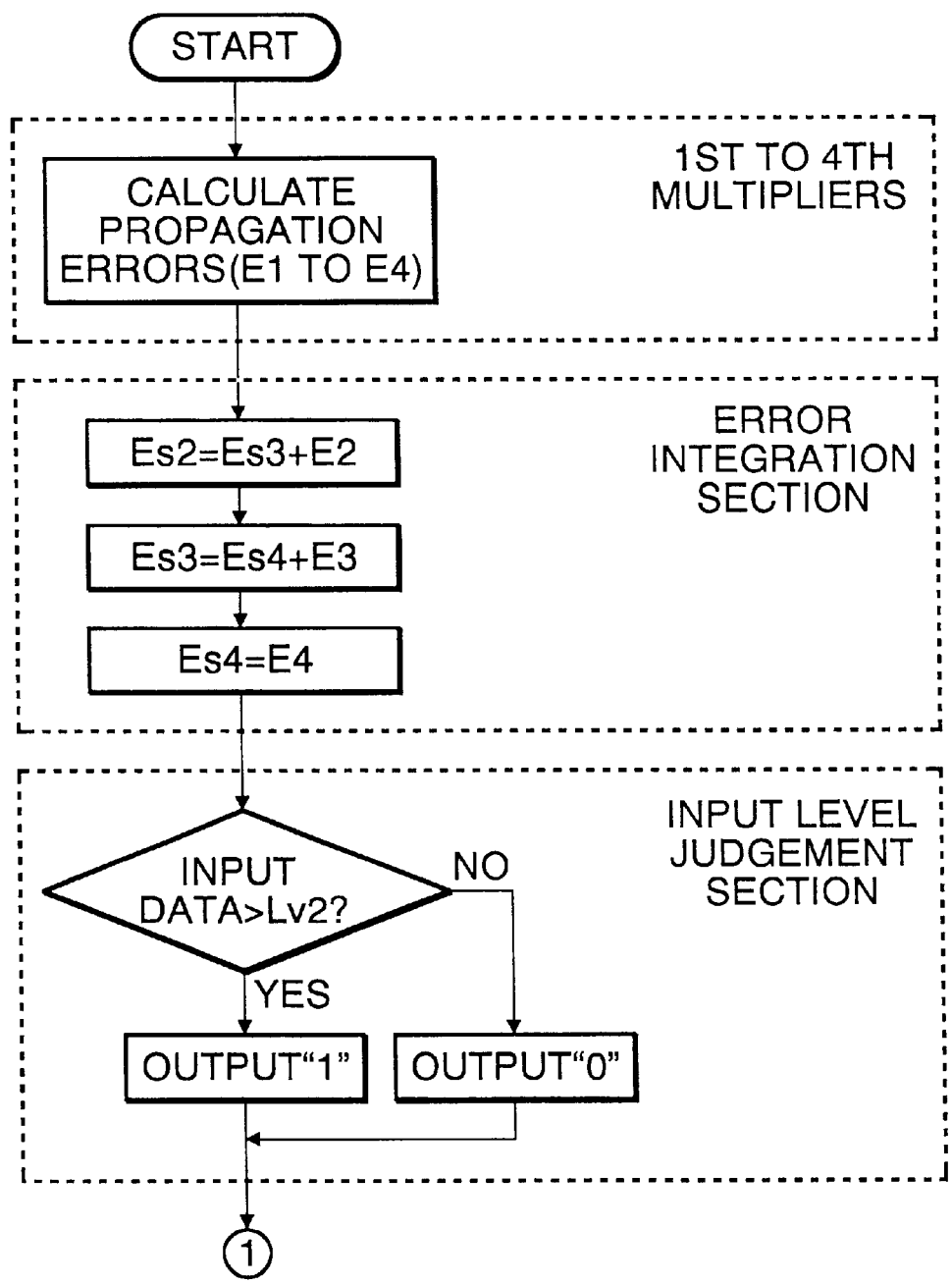
FIGS. 6A and 6B are flow charts showing processing by the propagation error operation section.
Figure 6B:
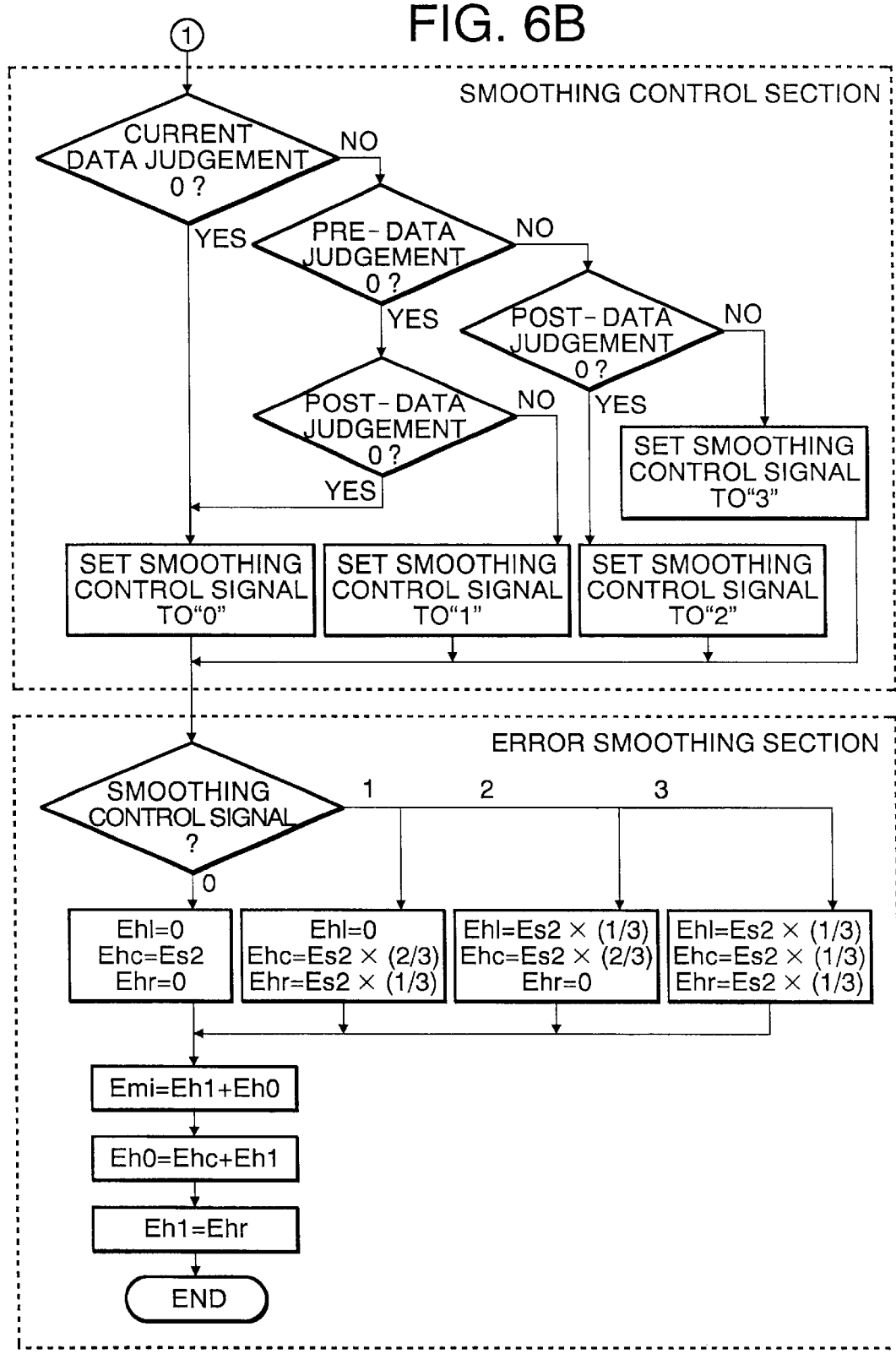

Then, the operation of propagation error operation section 205 in the image processor in the Embodiment 1 is described with reference to the flow chart illustrated in FIG. 6.

Figure 7A:
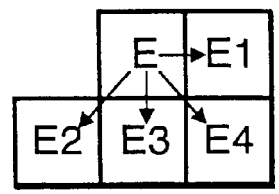
FIGS. 7A to 7C are schematic diagrams showing the error propagation status.

First, in each of first multiplier 401 to fourth multiplier 404, binary error E input from binary error calculation section 203 is multiplied by propagation coefficients K1 to K4 input from propagation coefficient judgment section 204 to obtain propagation errors E1 to E4. Then, as illustrated in FIG. 7A, E1, E2, E3, and E4 are propagated to the right pixel, left bottom pixel, bottom pixel, and right bottom pixel, respectively. Propagation error E1 is output to error addition section 201 as a correction value, while propagation errors E2 to E4 are output to error integration section 405.

Figure 7B:
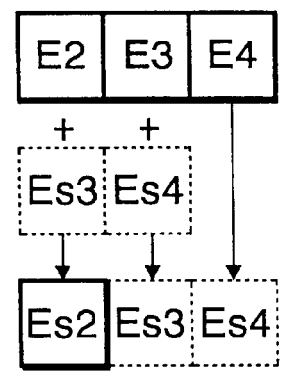

Then, as illustrated in FIG. 7B, error integration section 405 calculates accumulated error Es2, accumulation register coefficients Es3 and Es4 using the following expression (1).

$$Es2=Es3+E2$$

$$Es3=Es4+E3$$

$$Es4=E4 \qquad (1)$$

Accumulated error Es2 is output to error smoothing section 407, while accumulation register coefficients Es3 and Es4 are stored in error integration section 405.

On the other hand, the input data of the next pixel on the right side of the target pixel is compared with preset reference data Lv2 in input level judgment section 406, and when the input data is greater than reference data Lv2, level judged signal 1 is output to smoothing control section 407, and when the input data is not greater than reference data Lv2, level judged signal 0 is output to smoothing control section 407.

Smoothing control section 407 stores the level judged signals corresponding to the target pixel and the pixels on both sides of the target pixel. Hereinafter, the level judged signal corresponding to the target pixel is referred to as "current data," that corresponding to the previous pixel on the left side of the target pixel as "pre-data," and that corresponding to the next pixel on the right side of the target pixel as "post-data."

When the current data is "0", the smoothing control signal to be output to error smoothing section 408 is set to "0". On the other hand, when the current data is "1", the pre-data and post-data are also judged. When the pre-data is "0" and post-data is "0", the smoothing control signal is set to "0", while when the pre-data is "0" and post-data is "1" the smoothing control signal is set to "1", when the pre-data is "1" and post-data is "0" the smoothing control signal is set to "2", and when the pre-data is "1" and post-data is "1" the smoothing control signal is set to "3".

Then, error smoothing section 408 performs the smoothing processing described below according to a value of the smoothing control signal above.

Firstly, smoothing register coefficients Ehl, Ehc, and Ehr are calculated using following expression (2).

When the smoothing control signal is "0"

$$Ehl=0, Ehc=Es2, Ehr=0$$

When the smoothing control signal is "1"

$$Ehl=0,$$

$$Ehc=Es2\times(2/3),$$

$$Ehr=Es2\times(1/3)$$

When the smoothing control signal is "2"

$$Ehl=Es2\times(1/3),$$

$$Ehc=Es2\times(2/3),$$

$$Ehr=0$$

When the smoothing control signal is "3"

$$Ehl=Es2\times(1/3),$$

$$Ehc=Es2\times(1/3),$$

$$Ehr=Es2\times(1/3) \quad (2)$$

Figure 7C:
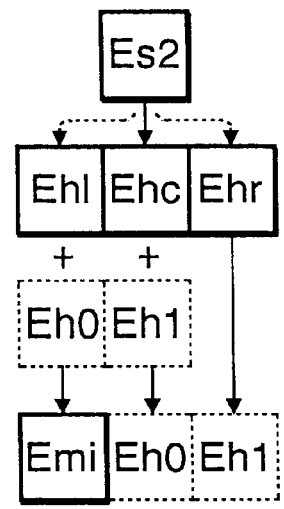

Then, as illustrated in FIG. 7C, correction value Emi, and re-accumulation register coefficients Eh0 and Eh1 are calculated from smoothing errors Ehl, Ehc, and Ehr using following expression (3).

$$Emi=Ehl+Eh0,$$

$$Eh0=Ehc+Eh1,$$

$$Eh1=Ehr \quad (3)$$

Re-accumulation error Emi is output to error memory 206, while re-accumulation register coefficients Eh0 and Eh1 are stored in error smoothing section 408.

Thus, the ability to perform smoothing per pixel basis according to the input data will suppress generation of texture patterns peculiar to error diffusion and achieve high quality images.

FIG. 8 is a schematic diagram illustrating the screen displays of the conventional and present inventions.

Figure 8A:
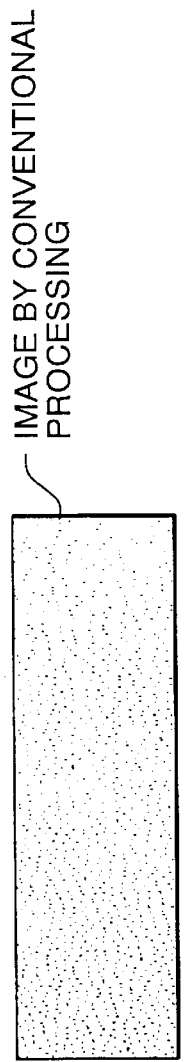
FIGS. 8A to 8E are schematic diagrams showing screen displays of the conventional and present inventions.

As illustrated in FIG. 8A, since the propagation coefficient is kept constant in the conventional image processor, specific texture patterns are generated in images with less concentration variations.

Figure 8B:
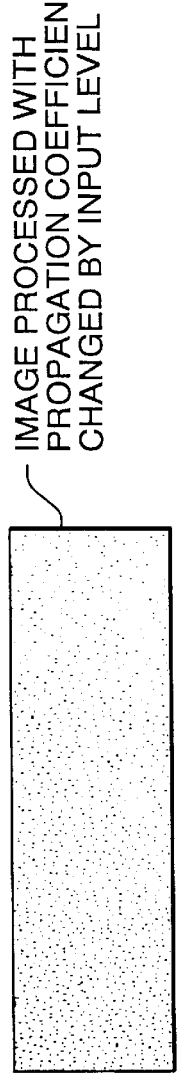

On the contrary, since the present invention changes the propagation coefficient with the input data, it is possible to suppress generation of texture patterns peculiar to error diffusion as illustrated in FIG. 8B.

Figure 8C:
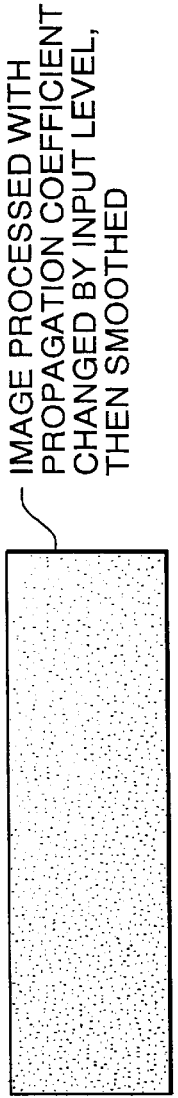

Furthermore, with the smoothing processing, it is possible to prevent generation of texture patterns peculiar to error diffusion almost completely as illustrated in FIG. 8C.

Figure 8D:
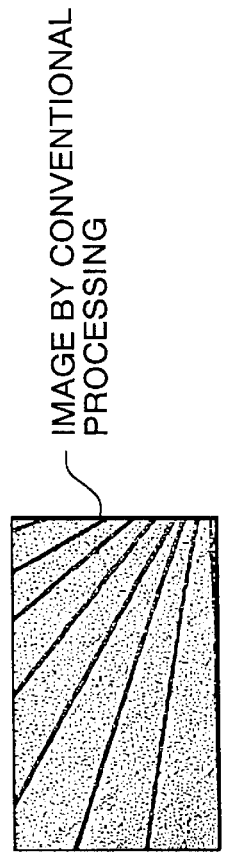

In addition, as illustrated in FIG. 8D, with the conventional image processor, errors to be diffused change drastically at areas where white points change to black points and thus the target pixel is affected by the previous error, producing white missing or black crushing.

Figure 8E:
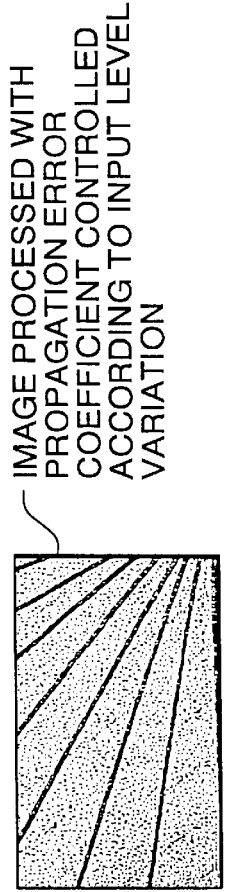

In contrast to this, the ability of the present invention to control the propagation coefficient propagating errors according to variations between the input data of the target pixel and the input data of the propagated pixel suppresses generation of white missing or black crushing peculiar to error diffusion at the contour areas without the pixel to be processed trailing the previous errors as illustrated in FIG. 8E.

(Embodiment 2)

Then, the following describes the case where color images are handled. In this case, propagation coefficient retention section 302 making up propagation coefficient judgment section 204 in FIG. 2 is replaced by fourth coefficient selection section 904 which connects three propagation coefficient retention sections 901 to 903 illustrated in FIG. 9. R propagation coefficient retention section 901, G propagation coefficient retention section 902, and B propagation coefficient retention section 903 retain coefficient groups used to process red data, green data, and blue data, respectively. Fourth coefficient selection section 904 selects the propagation coefficient retention section of each of said colors using a color selection signal which indicates the color of the current image, and outputs this selected propagation coefficient retention section to first coefficient selection section 303 and second coefficient selection section 304.

Figure 10:
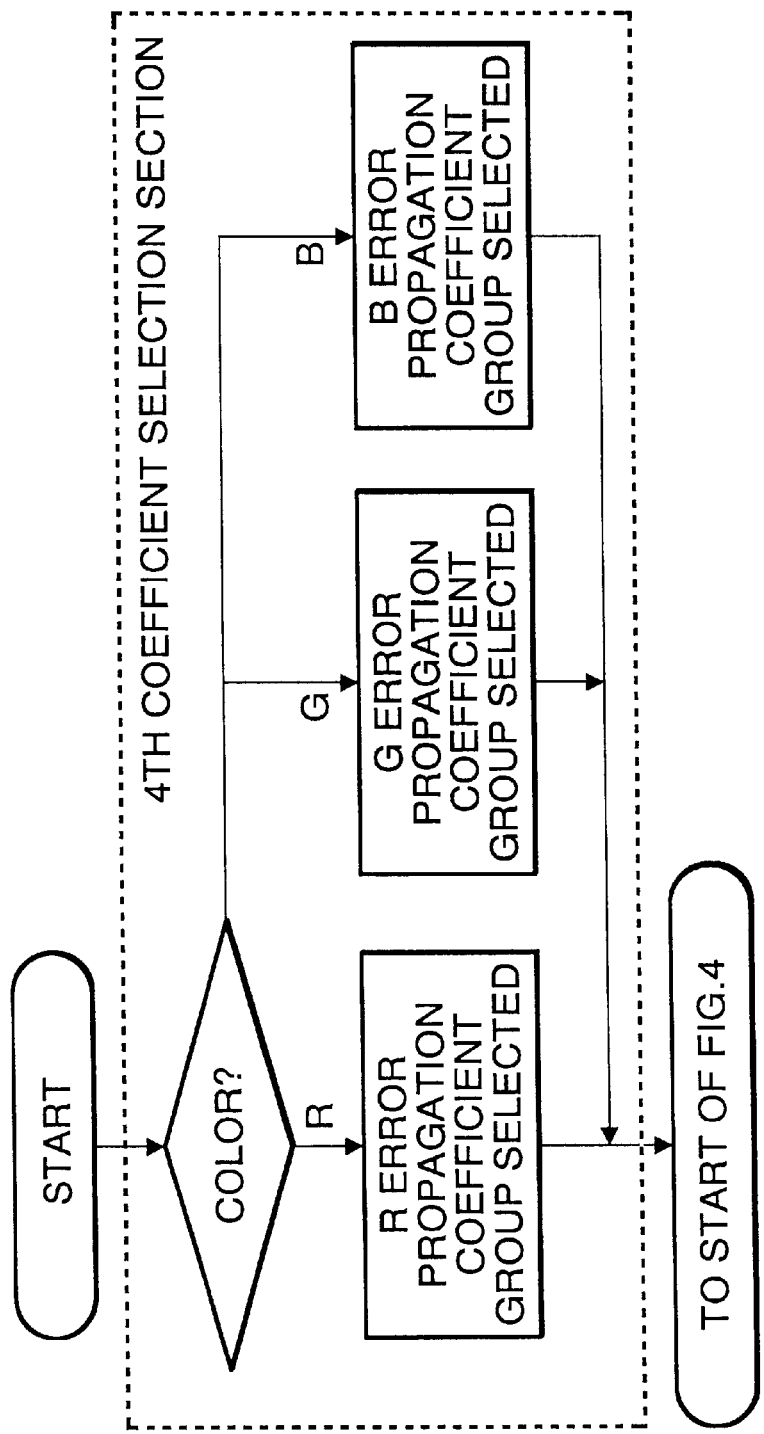
FIG. 10 is a flow chart in the case of processing a color image.

Then, the following describes the operation in the case where the color images above are handled, with reference to FIG. 10. The basic operation is the same as that illustrated in the flow chart in FIG. 5, but with an additional operation of the fourth coefficient selection section prior to selection of the coefficients in the first and second coefficient selection sections.

That is, when a color selection signal is input to fourth coefficient selection section 904, the color is judged and based on this judgment result, one coefficient group of the R propagation coefficient retention section 901, G propagation coefficient retention section 902, and B propagation coefficient retention section 903 is selected and output to coefficient group first coefficient selection section 303 and second coefficient selection section 304.

Figure 5A:
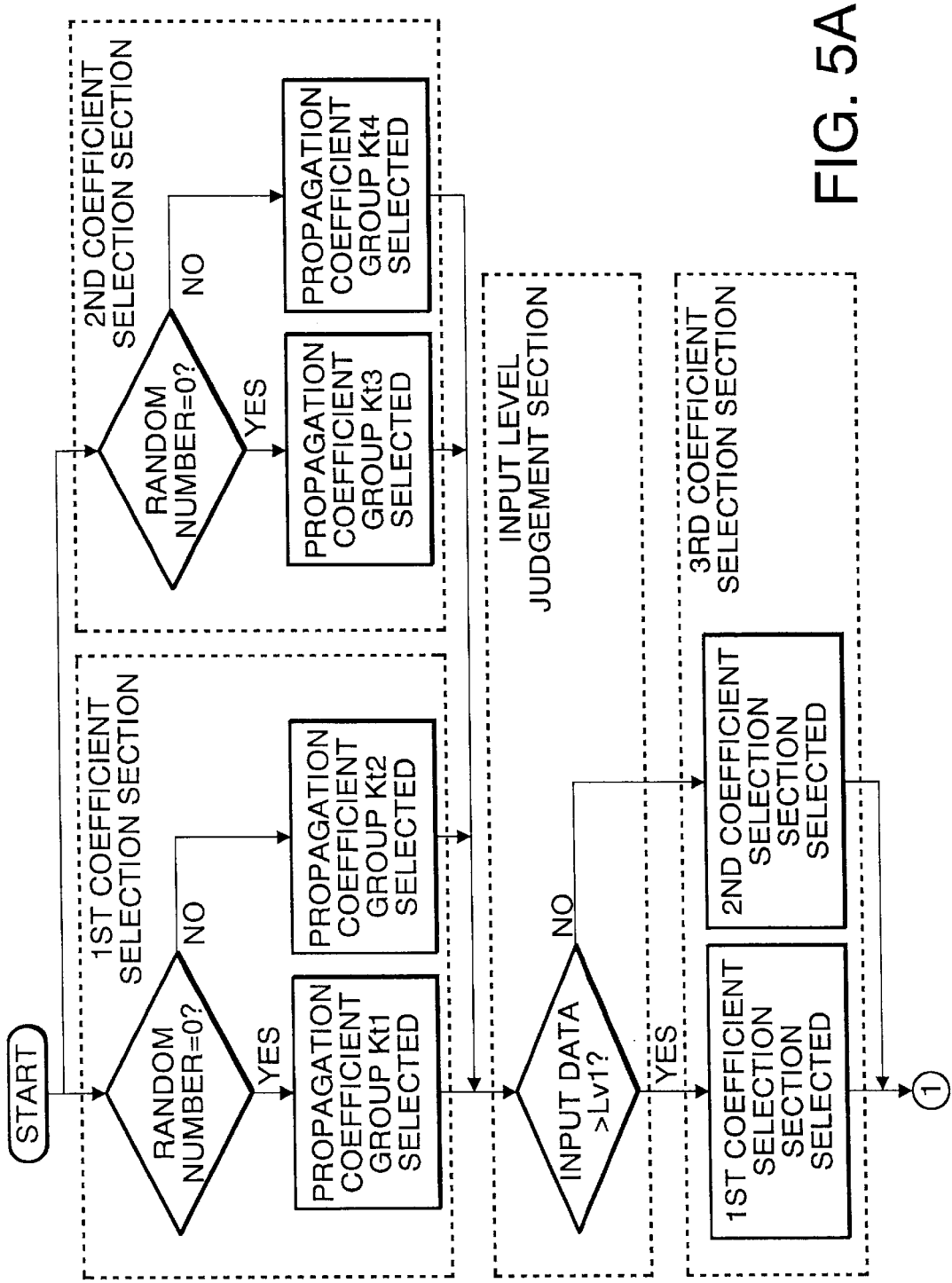
FIGS. 5A and 5B are flow charts showing processing by the propagation coefficient judgment section.
Figure 5B:
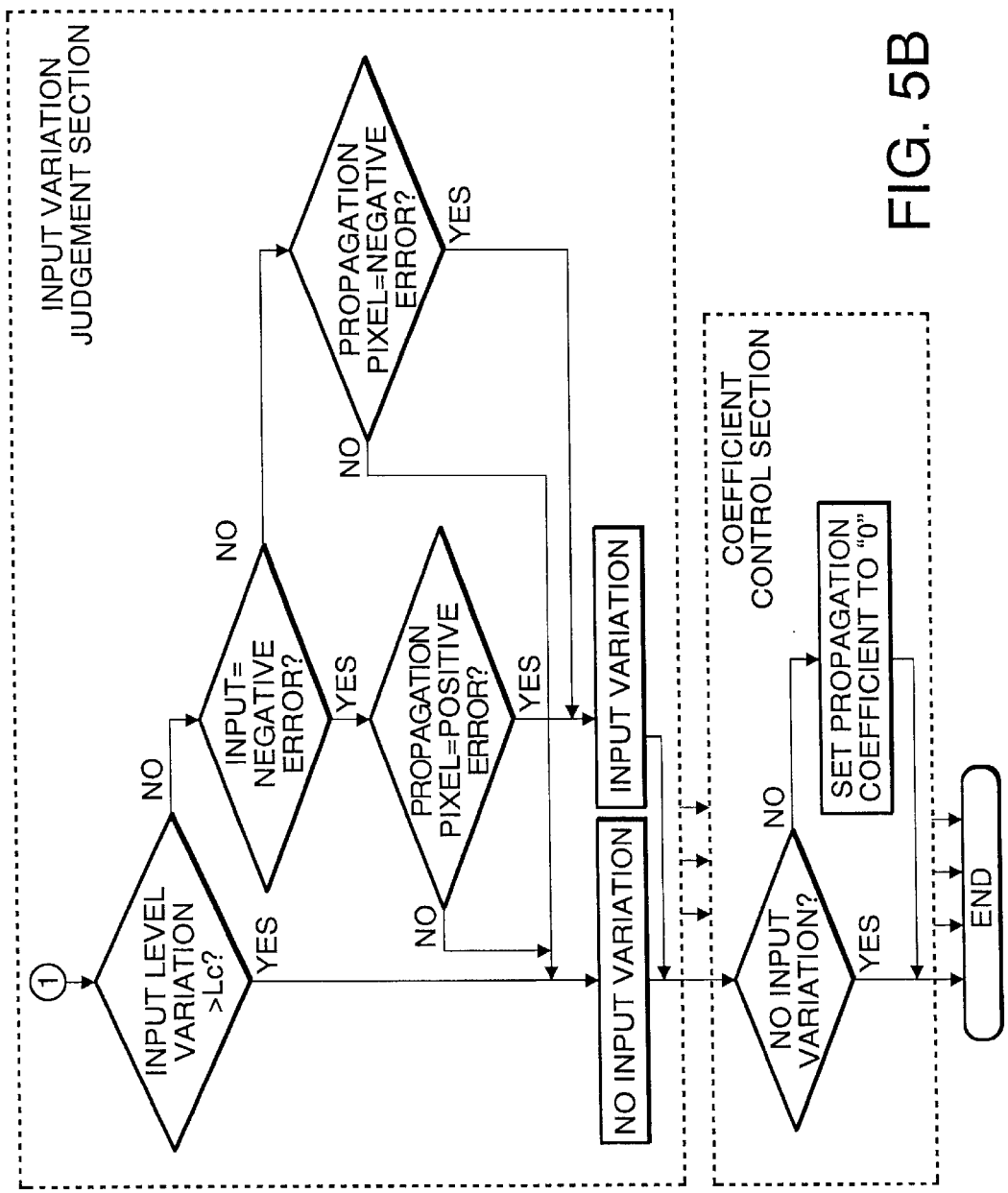

The subsequent operation is the same as that explained in FIG. 5, and therefore the explanation thereof is omitted.

The configuration above allows the propagation coefficient to be changed for each color, enabling dot locations for each color, reducing dot overlapping between different colors.

(Embodiment 3)

Figure 11:
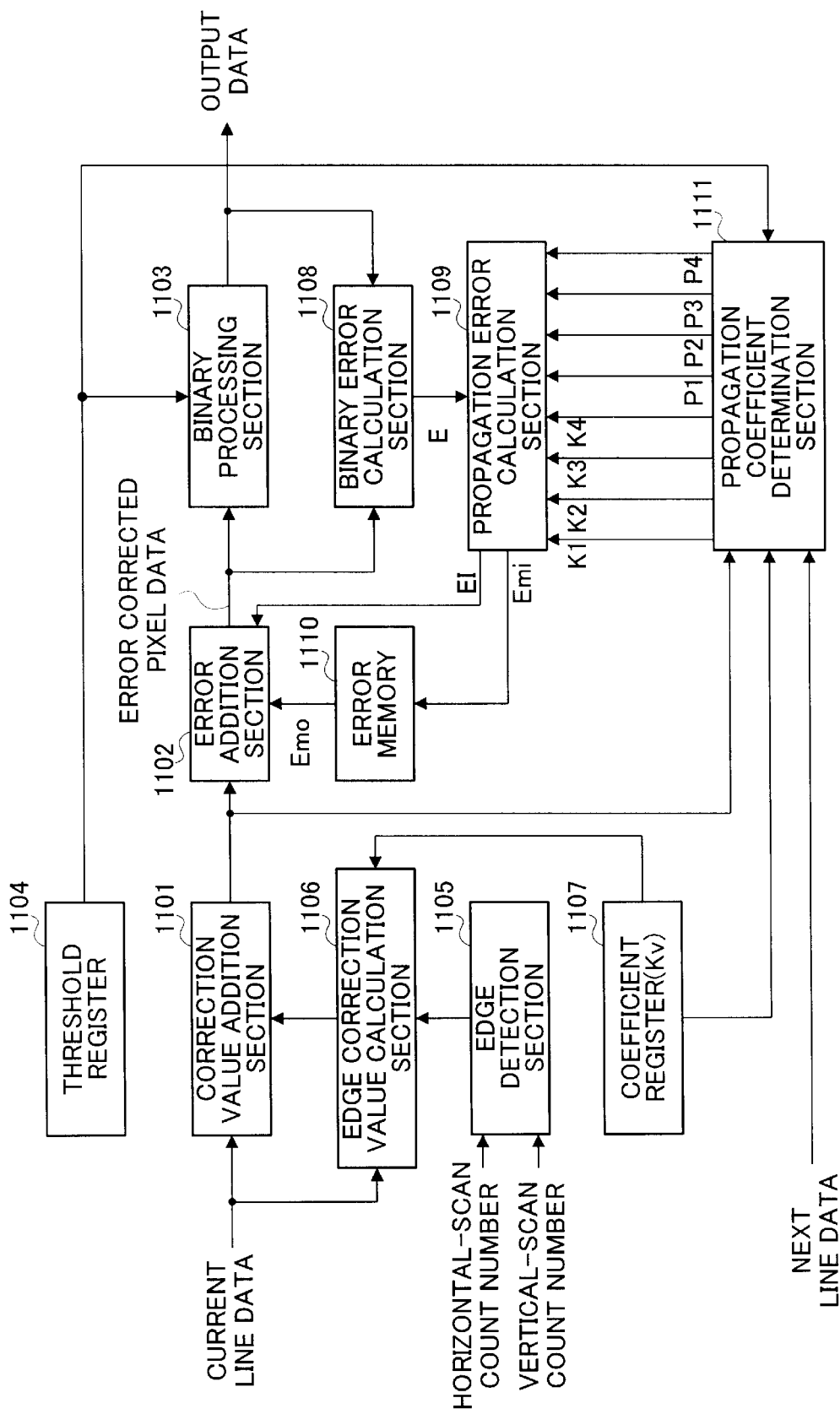
FIG. 11 is an entire configuration of an image processor according to Embodiment 3.

FIG. 11 illustrates a schematic configuration of an image processor according to this embodiment. The image processor of this embodiment has correction value addition section 1101 that adds an edge correction value to an input pixel, error addition section 1102 that adds an error generated in peripheral pixels to the edge correction value added to image data, binary processing section 1102 that performs binary processing on the error corrected pixel data with a binary threshold, and threshold register 1104 that stores the binary threshold.

Further in order to generate the edge correction value to be provided to correction value addition section 1101, the image processor has edge detection section 1105 to which a horizontal-scan count number and vertical-scan count number are input, edge correction value calculation section 1106 that calculates an edge correction value from an edge detection signal of a document and setting coefficient kv, and coefficient register 1107 that stores correction value coefficient Kv.

Furthermore in order to generate a propagation error (including alternative error) in each direction to be provided to error addition section 1102, the image processor is provided with binary error calculation section 1108 that calculates a binary error from the error corrected pixel data and binary data, propagation error calculation section 1109 that calculates a propagation error or alternative error in each direction from the binary error (or correction value), propagation error coefficient (or correction coefficient) in each direction and others, error memory 110 to write a calculated propagation error or alternative error therein, and propagation error determination section 1111 that determines the propagation error coefficient and others.

The following explains about the operation of the image processor of this embodiment configured as described above.

Edge detection section 1105 detects a left edge or upper edge of a document using the horizontal-scan count number and vertical-scan count number, and outputs the edge detection signal to edge correction value calculation section 1106. Edge correction value calculation section 1106 has a propagation error calculation section and propagation coefficient determination section therein, and calculates the edge correction values of the upper edge and left edge using current line data and correction value coefficient Kv. The calculation of the edge correction value in edge correction value calculation section 1106 will be described later.

Correction value addition section 1101 adds the edge correction value from edge correction value calculation section 1106 and pixel data of the input pixel, and outputs edge corrected data to error addition section 1102. Error addition section 1102 adds the edge corrected data of the input pixel, and an error between a current line and previous line provided from error memory 1110 and another error between a current pixel and previous pixel provided from propagation error calculation section 1108. Binary processing section 1103 performs binary processing on the error corrected pixel data with the binary threshold from threshold register 1104 to output as output data.

Meanwhile binary error calculation section 1108 calculates a binary error between the output data and the error corrected pixel data to be input to binary processing section 1103. Calculated binary error E is output to propagation error calculation section 1109.

Propagation error calculation section 1109 calculates errors (or alternative errors) in every direction for each direction from binary error E input from binary error calculation section 1108, K1, K2, K3 or K4 that are error propagation coefficients (or correction values) in the respective error propagation directions, and P1, P2, P3 or P4 that are errors (alternative errors) in the respective directions. An error for a next pixel is output to error addition section 1102 as E1, and as an error for a next line, errors of three pixels are accumulated and output to error memory 1110. Error memory 1110 stores an error of a previous line provided from propagation error calculation section 1109, and outputs an error for a current line to error addition section 1102.

Propagation coefficient determination section 1111 determines K1, K2, K3 and K4 that are the error propagation coefficients or correction coefficients in the respective error propagation directions, and P1, P2, P3 and P4 that are the correction values in the respective directions to output to propagation error calculation section 1109, using current line data and next line data, correction value coefficient Kv input from coefficient register 1107, and the binary threshold from threshold register 1104.

Propagation coefficient determination section 111 is explained specifically herein.

Figure 12:
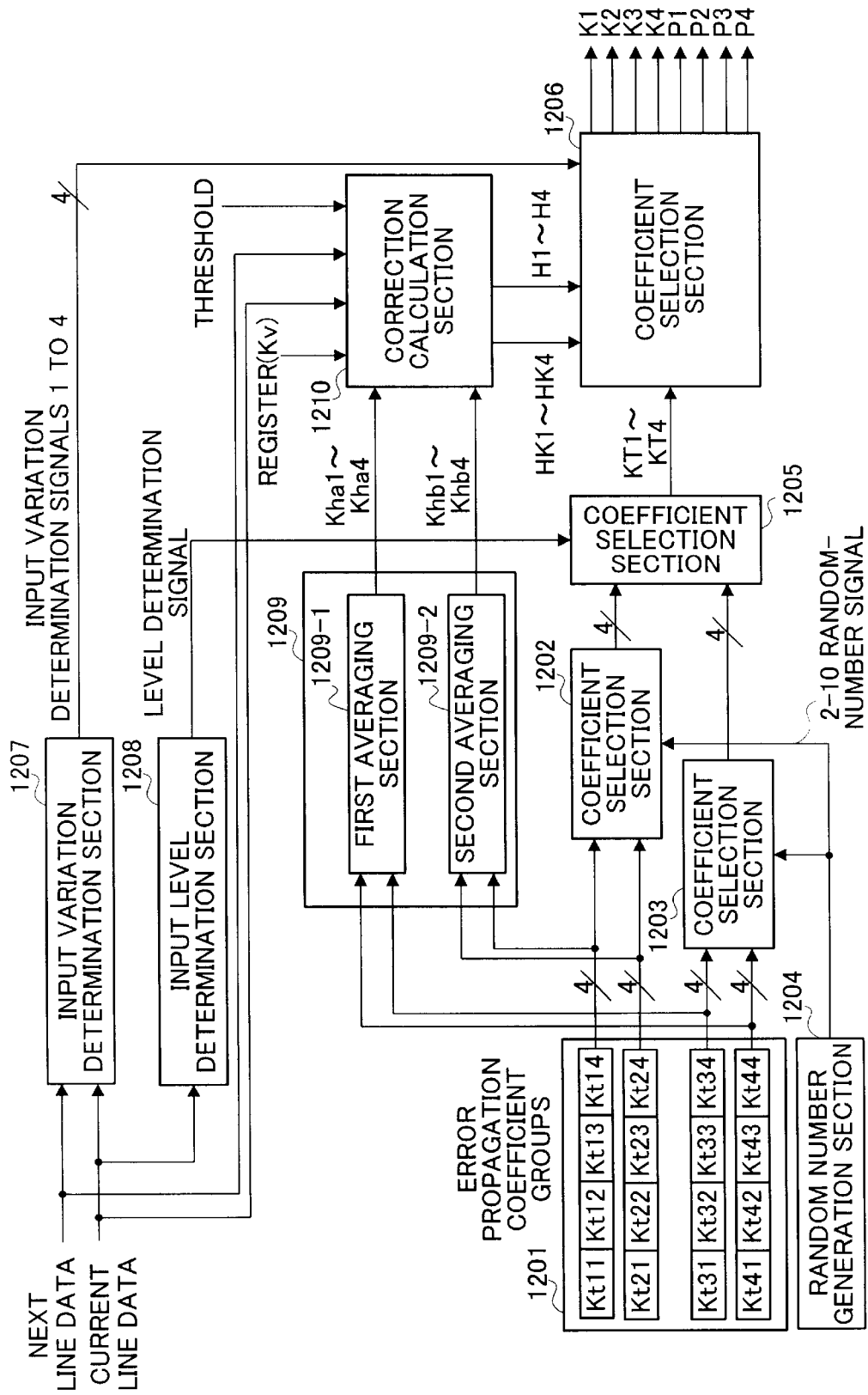
FIG. 12 is a block diagram of a propagation coefficient determination section in the Embodiment 3.

FIG. 12 illustrates a functional block diagram of propagation coefficient determination section 111. Propagation coefficient determination section 111 is provided with error coefficient memory 1201 in which error propagation coefficient groups are stored, two of coefficient selection sections 1202 and 1203 to select error propagation coefficient concurrently in parallel, random number generation section 204 that generates random numbers for use by in selecting error propagation coefficient randomly in coefficient selection sections 1202 and 1203, and coefficient selection section 1205 that selects two pairs of error propagation coefficients selected in coefficient selection sections 1202 and 1203 corresponding to a level determination signal of the input pixel. Propagation coefficient determination section 1111 is also provided with first averaging section 1209-1 and second averaging section 1209-2 each of which averages two error propagation coefficients to be selected in respective coefficient selection sections 1202 and 1203, correction calculation section 1210 that calculates the correction value and correction coefficient in each error propagation direction, and coefficient control section 1206 that selects for each error propagation direction the correction value or correction coefficient from correction calculation section 210 and the error propagation coefficient or 0 from coefficient selection section 1205, corresponding to input variation determination signals 1 to 4. In addition, the input variation determination signals 1 to 4, each indicative of a pixel variation in respective error propagation direction from the input pixel that is a reference, are provided from input variation determination section 1207 to coefficient control section 1206. The level determination signal indicative of a level of the input pixel is provided from input level determination section 1208 to coefficient selection section 1205.

Propagation error memory 1201 has as error propagation coefficient groups four coefficient groups of Kt1 (Kt11, Kt12, Kt13, Kt14) , Kt2 (Kt21, Kt22, Kt23, Kt24) , (Kt3, Kt32, Kt33, Kt34) and Kt4 (Kt41, Kt42, Kt43, KT44).

Coefficient selection section 1202 selects either of Kt1 or Kt2 using the random-number signal output from random number generation section 204. At the same time, another coefficient selection section 1203 selects either of Kt3 or Kt4. Coefficient selection section 1205 selects one out of two coefficient groups selected in coefficient selection sections 1202 and 1203 using the input level determination signal from input level determination section 1208. The coefficients selected in coefficient selection section 1205 as a second stage are input to coefficient control section 1206 as (KT1, KT2, KT3, KT4).

Meanwhile in coefficient averaging section 1209, averaging sections 1209-1 and 1209-2 receive groups of coefficients to be input to coefficient selection sections 1202 and 1203, respectively. First averaging section 1209-1 outputs averaged coefficients (Kha1 to Kha4), and second averaging section 1209-2 outputs averaged coefficients (Khb1 to Khb4), to correction calculation section 1210. Thus averaging the error propagation coefficients selected based on the random number provides the effect of suppressing the adverse effect provided by changing the error propagation coefficient using the random numbers.

Correction calculation section 1210 receives the current line data, next line data, averaged coefficients (Kha1 to Kha4) and (khb1 to Khb4), the correction coefficient Kv from coefficient register 1107, and the threshold from threshold register 1104, and based on the input data, calculates correction coefficients KH1 to KH4, and correction values H1 to H4 in respective error propagation directions.

Figure 13:
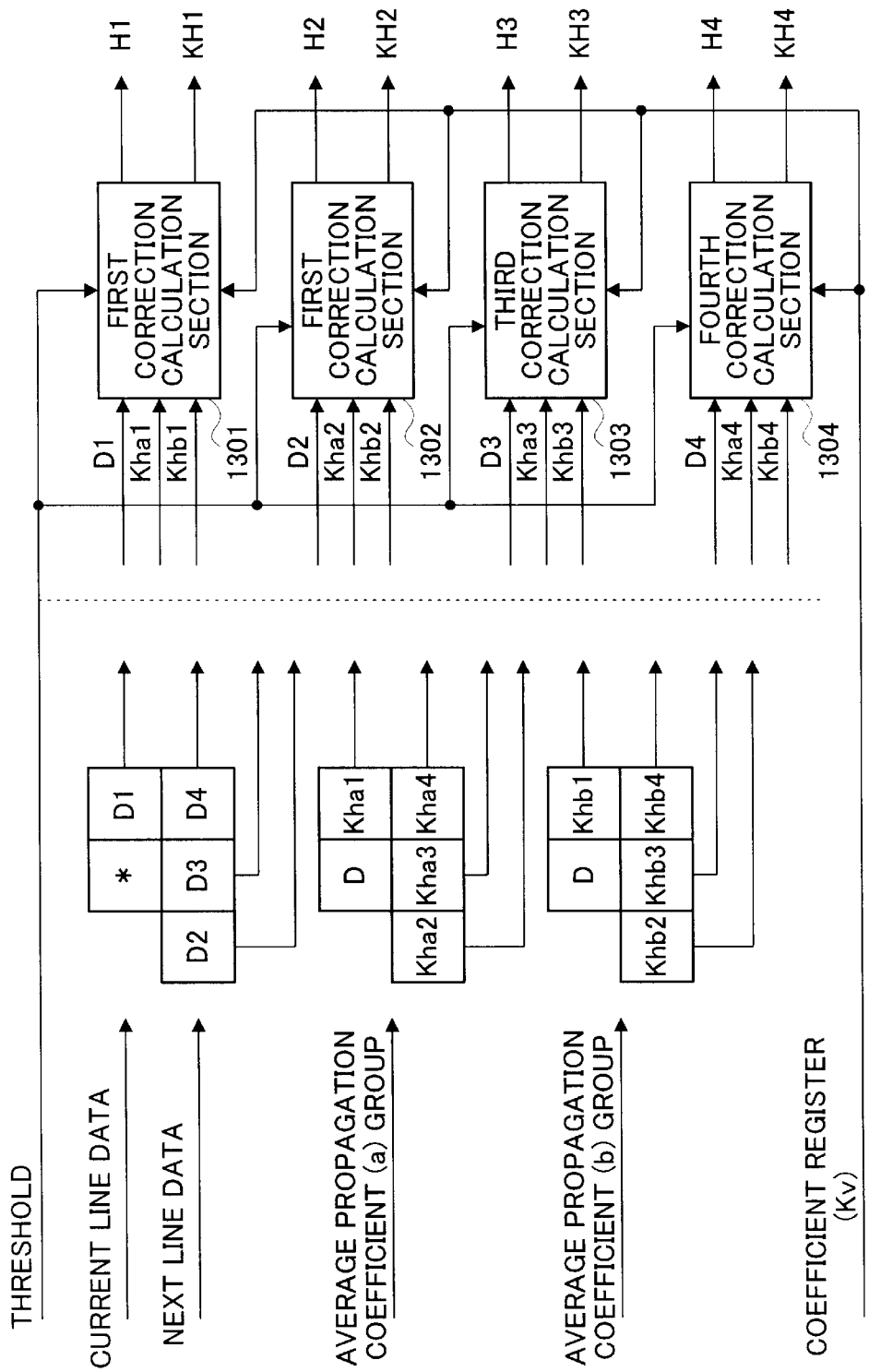
FIG. 13 is a block diagram of a correction calculation section in the Embodiment 3.

FIG. 13 illustrates a configuration of correction calculation section 1210. Correction calculation section 1210 is provided with fist to fourth correction calculation sections 1301 to 1304 for each direction of error propagation directions. As viewed in FIG. 13, first correction calculation section 1301 calculates the correction coefficient KH1 and the correction value H1 in a rightward error propagation direction from a target pixel, second correction calculation section 1302 calculates the correction coefficient KH2 and the correction value H2 in a lower leftward error propagation direction from the target pixel, third correction calculation section 1301 calculates the correction coefficient KH3 and the correction value H3 in a lower error propagation direction from the target pixel, and fourth correction calculation section 1304 calculates the correction coefficient KH4 and the correction value H4 in a lower rightward error propagation direction from the target pixel.

For example, as viewed in FIG. 13, first correction calculation section 1301 receives a pixel value (D1) of a pixel neighboring to the right side of the target pixel, the averaged coefficient Kh in the rightward direction input from first averaging section 1209-1, the averaged coefficient Khb1 in the rightward direction input from second averaging section 1209-2, and the binary threshold input from threshold register 1104, and calculates the correction coefficient KH1 and the correction value H1 in the rightward direction.

Figure 14:
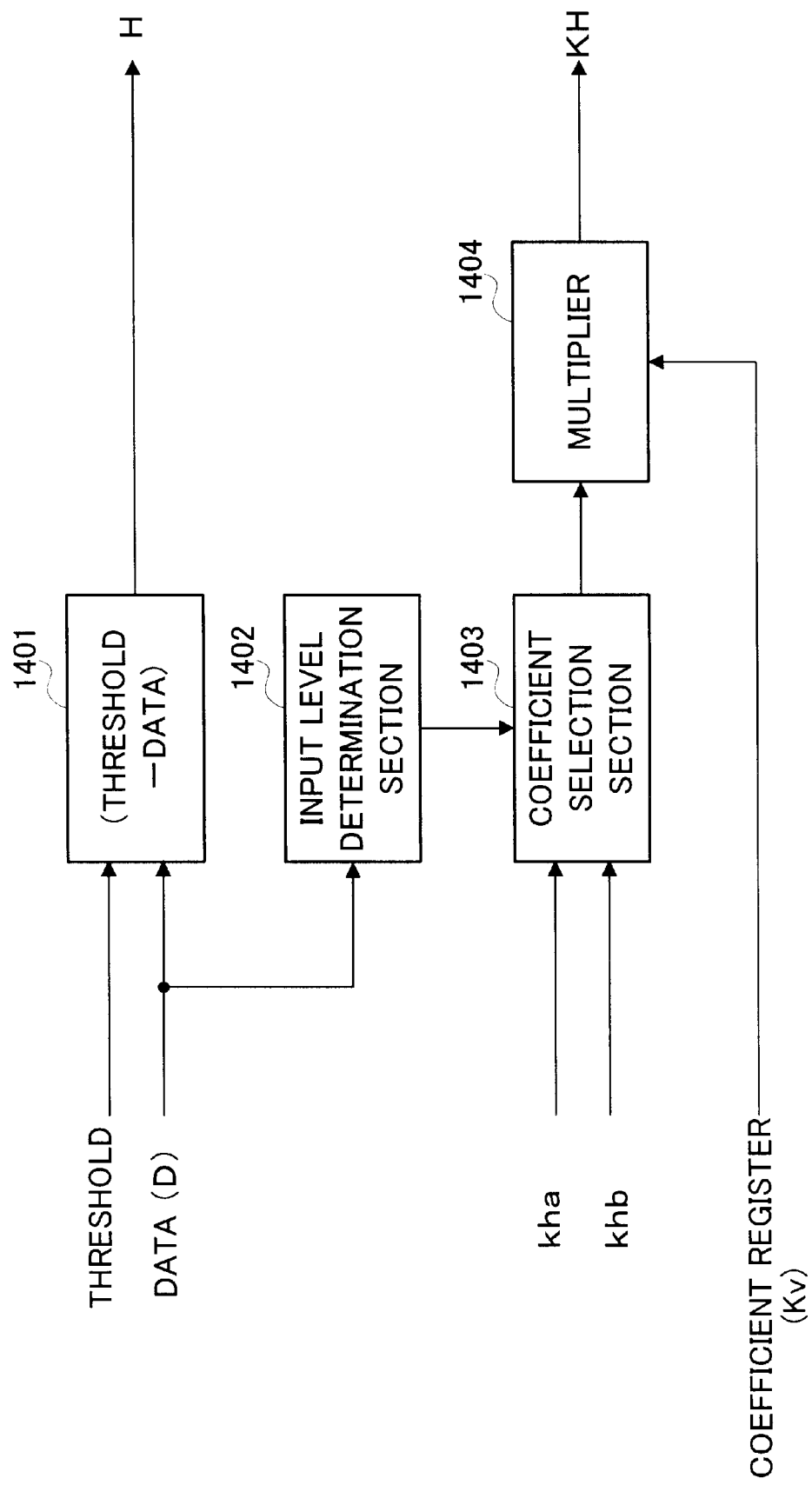
FIG. 14 is a block diagram of first to fourth correction calculation sections in the Embodiment 3.

FIG. 14 illustrates a configuration of correction calculation section (1301 to 1304). Subtracter 1401 subtracts a pixel value of an error propagated pixel from the binary threshold from threshold register 1104, and outputs the subtracted result as correction value H. Input level determination section 1402 performs level determination on the pixel value of the error propagated pixel, and based on the determined result, coefficient selection section 1403 selects KHa and KHb that are average error propagation coefficients. Multiplier 1404 multiplies the selected averaged error propagation coefficient (KHa or KHb) by the correction value coefficient Kv (Kv<1) from coefficient register 1107, and outputs the correction coefficient KH. As described above, first to fourth correction calculation sections 1301 to 1304 calculate respective correction coefficients KH1 to KH4 and respective correction values H1 to H4 in respective error propagation directions.

Figure 15:
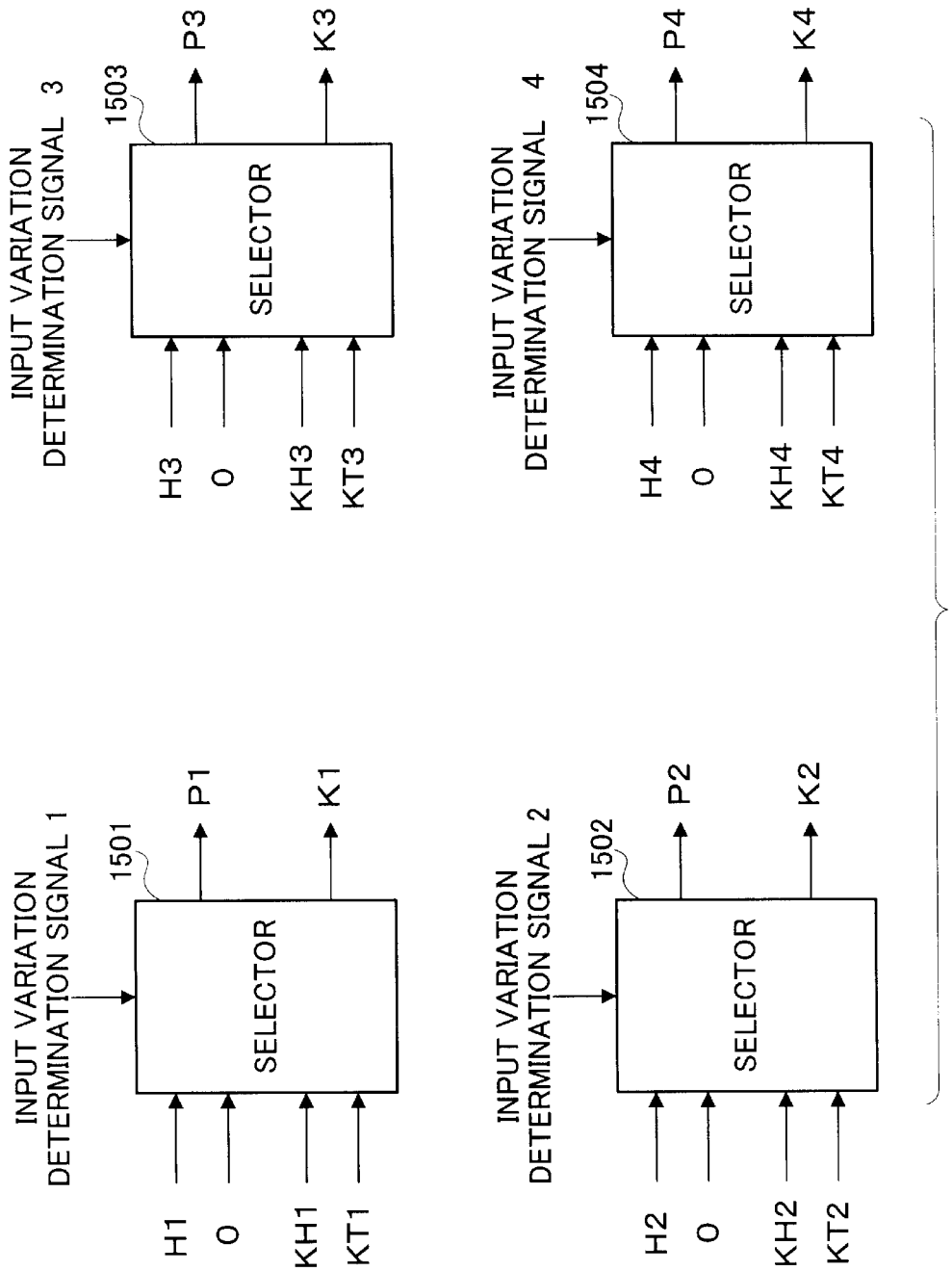
FIG. 15 is a diagram illustrating a selector in the coefficient control section in the Embodiment 3.

FIG. 15 illustrates a configuration of coefficient control section 1206. Coefficient control section 1206 is provided with selectors 1501 to 1504 for each error propagation direction. Selector 1501 provided corresponding to a rightward direction in the error propagation direction selects either of correction coefficient KH1 or error propagation coefficient KT1 using the input variation determination signal 1 indicative of a determination on the input variation in the rightward direction, and concurrently selects either of the correction value H or 0 (0 is used as a selection signal of the correction value or error value in propagation error calculation section 1109). At this point, a pair of the correction coefficient and correction value or the error propagation coefficient and 0 is selected. When the input variation determination signal 1 is indicative of a large pixel value variation being present in the rightward direction, propagation error calculation section 1109 selects the pair of correction coefficient KH1 and correction value H1 to calculate the alternative error. When the input variation determination signal 1 is indicative of a large pixel value variation being not present in the rightward direction, propagation error calculation section 1109 selects the pair of error propagation coefficient KT1 and 0 as usual. The error propagation coefficient KT1 or correction coefficient KH1 and 0 or correction value H1 selected in selector 1501 are output to propagation error calculation section 1109, respectively as error propagation coefficient K1 and correction value P1. Similarly selectors 1502 to 1504 each selects either pair of the correction coefficient and correction value or the error propagation error coefficient and 0 corresponding to the respective input variation determination signals 1 to 4 in the respective directions.

Figure 16:
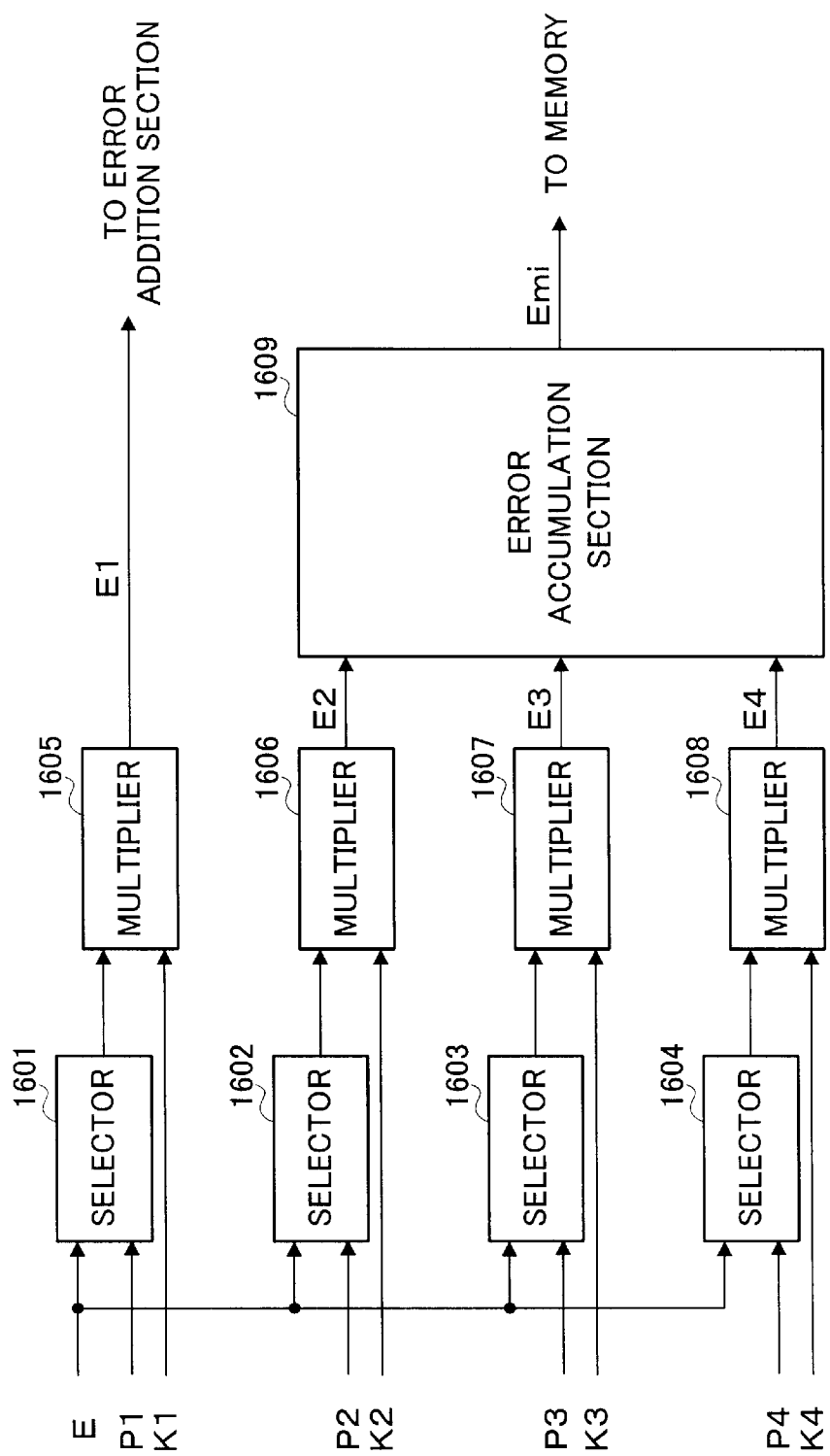
FIG. 16 is a block diagram of a propagation error calculation section in the Embodiment 3.

FIG. 16 illustrates a configuration of propagation error calculation section 1109. In propagation error calculation section 1109, selectors 1601 to 1604 provided for each error propagation direction receive respective correction values P1, P2, P3 and P4 and error propagation coefficients K1, K2, K3 and K4 in respective directions input from propagation coefficient determination section 111, and the binary error E input from binary error calculation section 1108.

Selectors 1601 to 1604 select respective inputs to multipliers 1605 to 1608 corresponding to correction values P1, P2, P3 and P4 in respective error propagation directions, respectively. Specifically selectors 1601 to 1604 select the binary error E input from binary error calculation section 1108 when the correction value P is 0, and select correction values P1, P2, P3 and P4 when the value P is not 0. By thus selecting the error E or correction value P corresponding to the input variation of the pixel value for each error propagation direction, it is possible to suppress the occurrence of white missing and black crushing at an edge of an image.

Multipliers 1605 to 1608 multiply respective results selected in selectors 1601 to 1604 by respective error propagation coefficients (or correction coefficients) K1, K2, K3 and K4 for respective error propagation directions. An output from multiplier 1605 that calculates the propagation error in the right direction is output to error addition section 1102 as the error E1 for the next pixel, and outputs from multipliers 1606, 1607 and 1608 are output to error accumulation section 1609. Error accumulation section 1609 accumulates errors corresponding to three pixels to output to error memory 1110 as an error Emi for the next line.

Ordinary processing and edge portion processing is explained with reference to FIG. 17.

Figure 17:
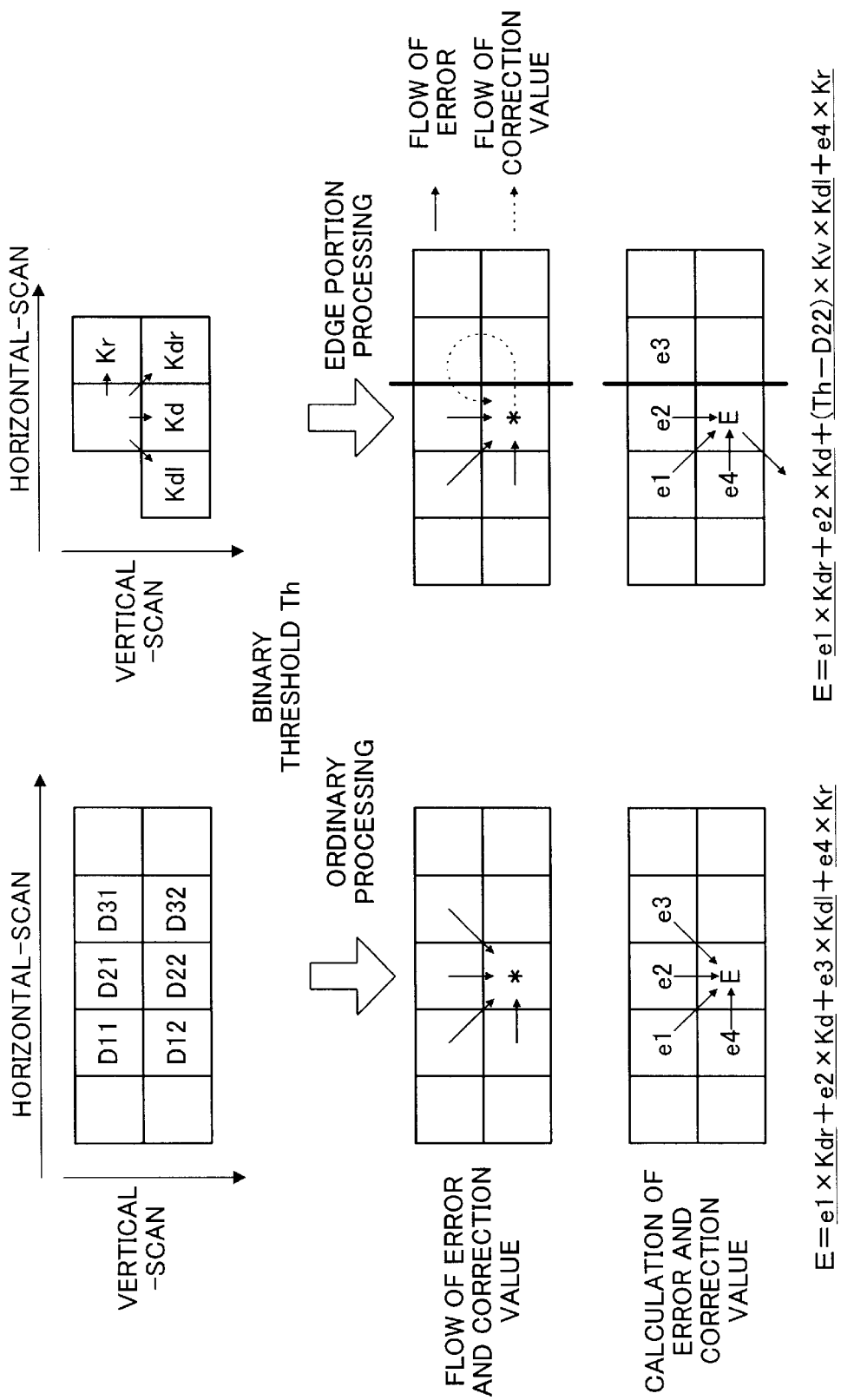
FIG. 17 is a process diagram to explain ordinary processing and edge portion processing in the Embodiment 3.

As illustrated in FIG. 17, it is assumed that inputs are D11 to D32 for the current line and previous line, error propagation coefficients are, as viewed from the target pixel in FIG. 7, Kr in the rightward direction, Kd1 in the lower leftward direction, Kd in the lower direction, and Kdr in the lower rightward direction, and that binary errors are e1, e2, e3 and e4 respectively in D11, D21, D31 and D12. On this assumption, the propagation errors and alternative errors in D22 are explained in the ordinary processing and edge portion processing.

In the ordinary processing, it is assumed that edge portions are not present in every direction with respect to a target pixel D22 that receives errors from peripheral pixels. The target pixel D22 is the error propagated pixel in determining propagation errors in peripheral pixels D11, D21, D31 and D12. When respective propagation errors are determined in peripheral pixels D11, D21, D31 and D12, propagation coefficient determination section 111 outputs error propagation coefficient=KT and correction value=0 as the error propagation coefficient K and correction value P in the direction where the target pixel D22 is present.

Accordingly when the propagation errors are determined in the peripheral pixels D11, D21 and D31, the error E output from binary error calculation section 1108 is multiplied by the respective error propagation coefficient KT in corresponding direction to obtain errors e1, e2 and e3, which are stored in memory 1110. When the propagation error is determined in the pixel D12 neighboring to the left side of the target pixel, the error E output from binary error calculation section 1108 is multiplied by the error propagation coefficient KT in the leftward direction to obtain the error e4, which is input to error addition section 1102. As a result, when the target pixel D22 becomes an object pixel in error addition section 1102, as shown in the equation (4), the error for D22 is determined by the sum of errors from the peripheral pixels (upper left, upper, upper right and right).

$$E=e1\times Kdr+e2\times Kd+e3\times Kd1+e4\times Kr \quad (4)$$

In the case of the edge portion processing, assume that an edge of an image is present between D21 and D31 positioning in the upper right from the target pixel D22, as viewed in FIG. 17, which receives errors from the peripheral pixels. When propagation errors of D31 to every direction are determined, coefficient control section 1206 outputs the correction coefficient=HK and the correction value=H output from correction calculation section 1210, respectively as the error propagation coefficient K and correction value P in the direction where the target pixel D22 is present. Propagation error calculation section 1109 receives the correction coefficient=HK and the correction value=H respectively as the error propagation coefficient K and correction value P, discontinues to propagate as the propagation error the error that D31 has to the target pixel D22, and sets error memory 1110 to propagate the alternative error obtained from the correction coefficient=HK and the correction value=H. The alternative error is obtained by multiplying the difference the binary threshold minus the pixel value of D22 by the product of the setting coefficient and the error propagation coefficient in the corresponding direction.

As described above, when the edge is present between D21 and D31, D22 receives the errors from the upper left, upper, and left pixels, and instead of the error to be propagated from the upper right side, receives the alternative error that is an error of D22 to the lower leftward direction, to add to the above errors, thus determining the propagation error to D22. As a result, when the target pixel D22 becomes the object pixel in error addition section 1102, as shown in the equation (5), the error to D22 is determined by the sum of the errors from peripheral pixels (upper left, upper, left as viewed in FIG,8) and the alternative error from upper right side (as viewed in FIG. 8).

$$E=e1\times Kdr+e2\times Kd+(Th-D22)\times Kv\times Kd1+e4\times Kr \quad (5)$$

Figure 18:
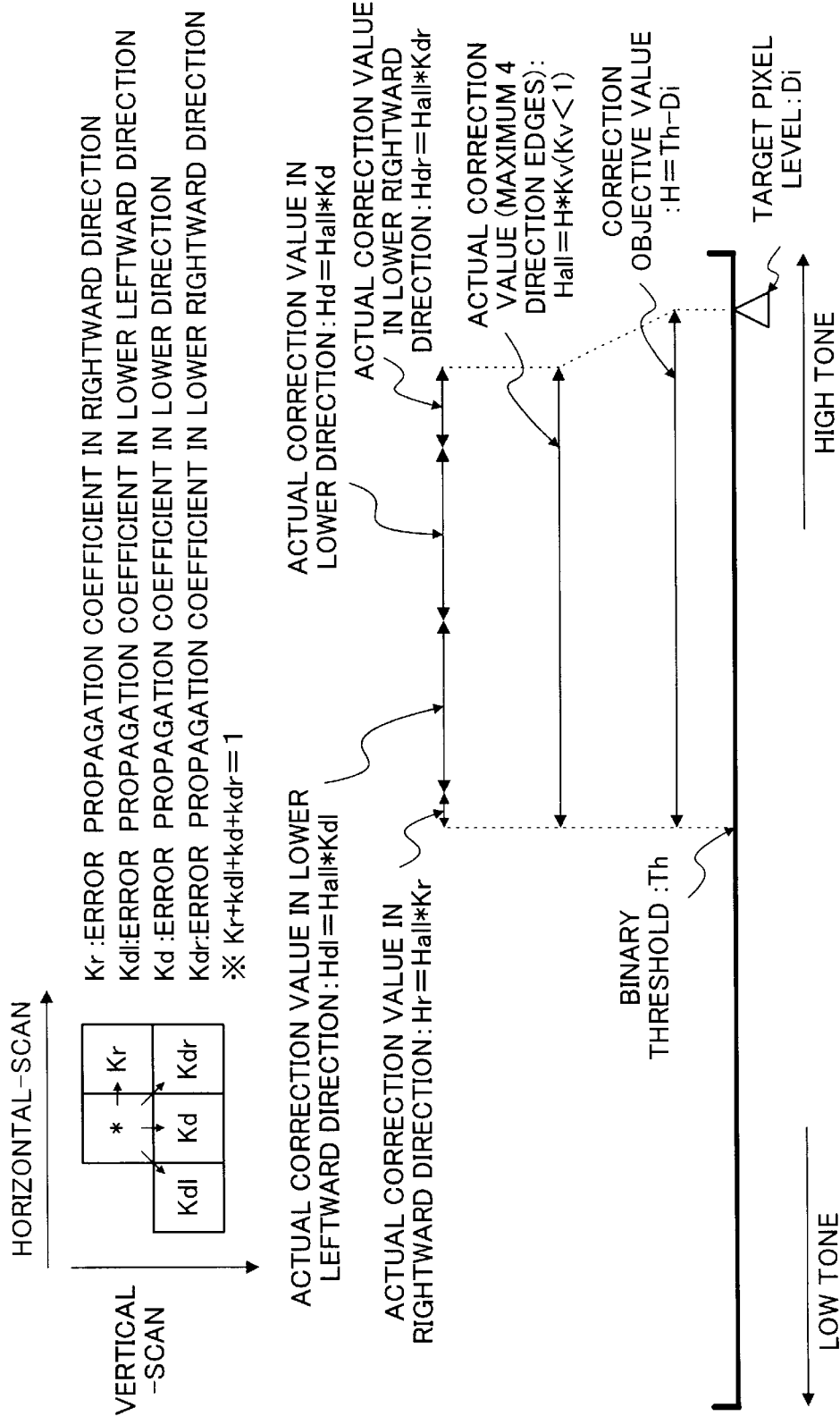
FIG. 18 is a diagram to explain a principle of error diffusion in the Embodiment 3.

FIG. 18 illustrates a diagram to explain the correction value obtained when a target pixel level is Di. It is assumed that the binary threshold is Th, the error propagation coefficients are Kr in the rightward direction, Kd1 in the upper leftard direction, kd in the lower direction, and Kdr in the lower rightward direction, as viewed from the target pixel in FIG. 18.

Correction object value H is indicated by the difference between the binary threshold and the target pixel level, as expressed below:

$$H=Th-Di \quad (6)$$

The actual correction value is next obtained by multiplying H by a setting coefficient Kv to determine an actual edge correction value. The setting value Kv below 1 obtains the correction value that does not exceed the correction object value.

$$Hall=H\times kv$$

The above equation corresponds to the sum of the correction values in the case of error propagation directions all toward the edge.

The actual correction value for each error propagation direction is obtained.

When the rightward direction is adopted as an example, the error propagation coefficient is obtained by multiplying the actual correction value by the error propagation coefficient in the rightward direction.

$$Hr=Hall\times Kr$$

It is thus possible to obtain the correction value for each direction with each error propagation coefficient, and the error propagation coefficient results in that Kr+Kd1+Kd+Kdr=1.Therefore it is understood that when all the directions are toward edges, the sum of the correction values (Hr+Hd1+Hd+Hdr) equals Hall.

The following explains about the contents of the edge correction processing in the above-mentioned edge correction value calculation section 1106. As described above, edge correction value calculation section 1106 is provided with the same components as propagation error calculation section 1109 illustrated in FIG. 16 and propagation coefficient determination section 111 illustrated in FIG. 12.

Edge correction value calculation section 1106 receives the pixel value of the target pixel of the current line data as pixel data D to be input to four of first to fourth correction calculation sections 1301 to 1304 in correction calculation section 1210. It is thereby possible to calculate the correction value required for the edge processing. First, subtracters 1401 in first to fourth correction calculation sections 1301 to 1304 obtain respective correction object values each by subtracting the pixel value Di from the binary threshold Th. At the same time, multipliers 1404 in first to fourth correction calculation sections 1301 to 1304 multiply respective averaged coefficients by the setting coefficient kv to obtain the correction coefficient KH. Next coefficient control section 1206 controls a signal corresponding to a direction toward the edge from among the input variation determination signals in every direction to be provided to respective selectors 1501 to 1504 from variation determination section 1207, to forcibly make such a signal to indicate a state of "variation is present", and sets the error propagation coefficients KT1 to Kt4 in every direction to be provided to respective selectors 1501 to 1504 to be all 0. As a result, the correction values except that toward the edge direction are made 0. Finally propagation error calculation section 1109 adds all of E1, E2, E3 and E4 output form respective multiplies 1605 to 1608 in propagation error calculation section 1109, and thereby the edge correction value can be obtained.

In addition, it maybe possible to obtain the same effect with a configuration in which the edge detection signal is input to the input variation determination section in propagation coefficient determination section 1111 to reflect it in the variation determination signal without using correction value addition section 1101 to add correction values, and then the correction values are once stored in the error memory to add in the error addition section. By changing forcibly in the edge processing the variation determination signal in the direction toward the edge to be indicative of the variation being present, the edge detection signal is reflected in the variation determination signal.

Figure 19A:
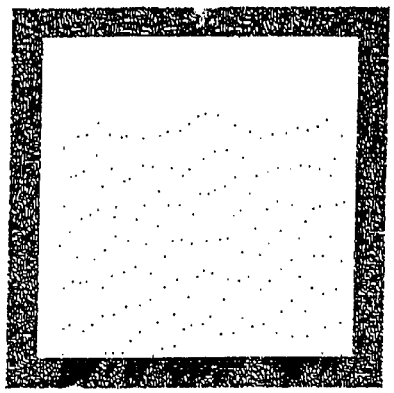
FIGS. 19A to 19E are sample diagrams when a correction coefficient is varied.
Figure 19B:
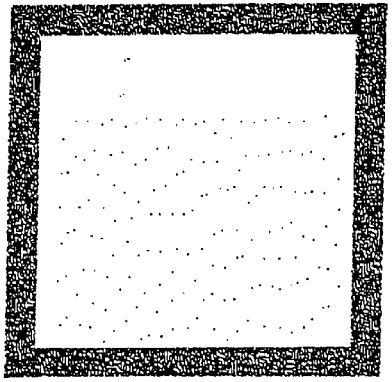
Figure 19D:
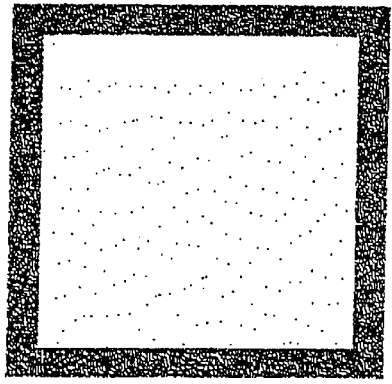
Figure 19C:
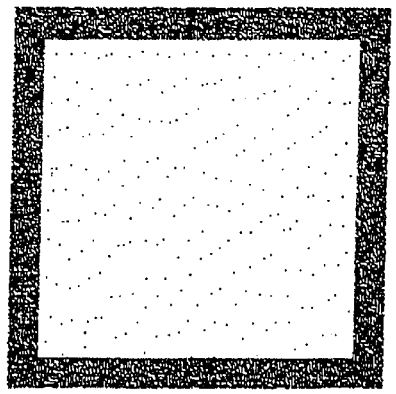
Figure 19E:
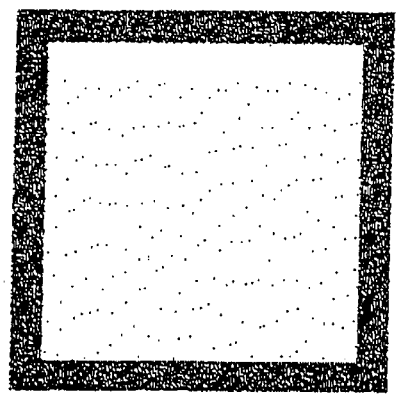

FIG. 19A illustrates a partial image subjected to a conventional error diffusion processing without the dot delay processing. The original image has 127 in peripheral, 254 in a square, and 256 tones. The generation of dots in the square is delayed, whereby the texture appears in the lower portion of the square.

FIG. 19B to FIG. 19E illustrate images obtained by executing dot delay processing on the similar original image, and thereby performing error diffusion. The setting coefficient Kv are respectively varied to 0/64, 25/64, 50/64 and 64/64. The texture in the lower portion of the square disappears by the dot delay processing, and closing Kv to 1 moves the position of dot appearance in the square to the upper left. Then at the time of 1 (64/64), the position reaches inside of the square. It is considered that 50/64 be appropriate for Kv.

Figure 20A:
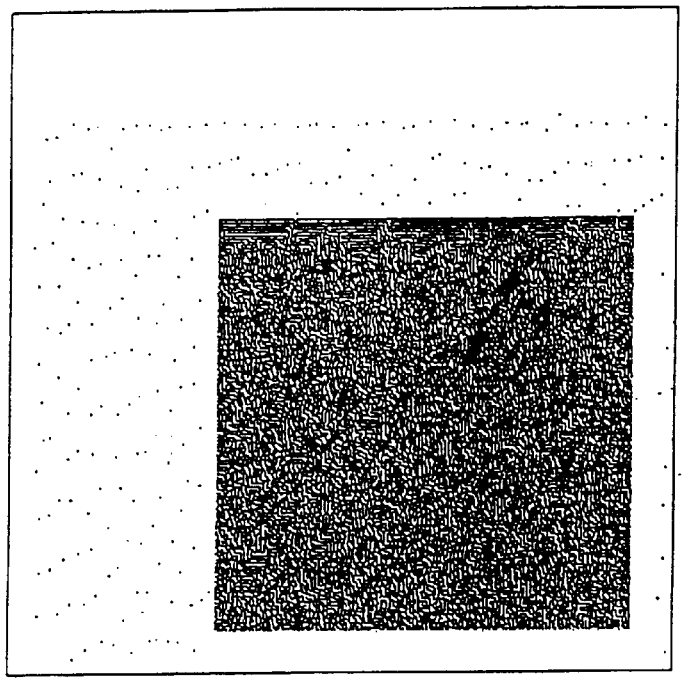
FIGS. 20A and 20B are sample diagrams when the present invention is applied.

FIG. 20A is an image subjected to a conventional error diffusion processing. The original image (within the black frame) has 254 in peripheral, 127 in a square, and 256 half-tone. The dot delays appear in the upper edge and left edge. Further the texture appears in the upper portion of the square. Furthermore, the dot delays appear in the background in the right and lower portion of the square.

Figure 20B:
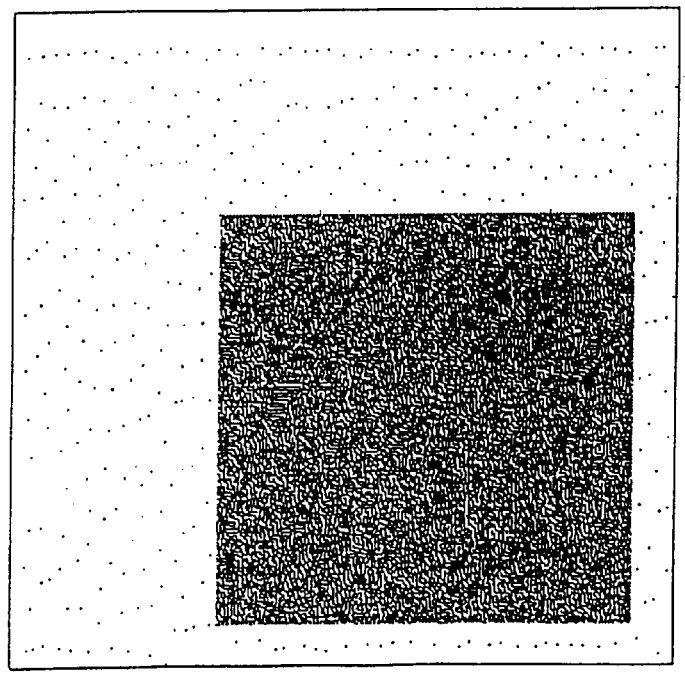

FIG. 20B is an image subjected to the error diffusion processing using the dot delay processing based on the input level difference of the present invention and the dot delay processing on the upper edge portion and left edge portion. The texture in the upper portion of the square and dot delays in the right-hand portion and lower portion of the square are solved by the dot delay processing based on the level difference. Further the dot delays at the upper edge and left edge are solved by the dot delay processing on the edge portion.

As described above in detail, in the present invention, it is possible to largely prevent the white missing and black crushing from occurring at portions corresponding to edges and portions where black-and white rapidly change, and therefore possible to provide an image processor enabling the improved image quality.

This application is based on the Japanese Patent Application Nos. HEI09-218004 filed on Jul. 29, 1997 and HEI10-094952 filed on Apr. 7, 1998, entire content of which is expressly incorporated by reference herein.

What is claimed is:

1. An image processor that processes an image with an error diffusion method, comprising:

a binary processor that transforms a target pixel into binary data;

a binary error calculator that calculates an error between said target pixel and said binary data;

a propagation coefficient judger that stores a plurality of set of coefficients and selects one set of coefficients;

a propagation error operator that multiplies said error by said selected one set of coefficients, and outputs a result of said multiplication as a correction value;

an error adder that adds said correction value to a next peripheral pixel that is input into said binary processor, wherein said propagation coefficient judger substitutes a value of 0 for said selected one set of coefficients when a change of a black point and a white point exceeds a predetermined value, said propagation coefficient judger further judging that a change of a black point and a white point exceeds a predetermined value when an absolute value of a difference between the target pixel and a peripheral pixel is greater than a reference value.

2. The image processor according to claim 1, wherein said propagation coefficient judger judges that a change of a black point and a white point exceeds a predetermined value when a binary error of the target pixel and a binary error of the peripheral pixel differ in polarity.

3. The image processor according to claim 1, wherein said propagation coefficient judger judges that a change of a black point and a white point exceeds a predetermined value when an absolute value of a difference between the target pixel and a peripheral pixel is greater than a reference value and a binary error of the target pixel and a binary error of the peripheral pixel differ in polarity.

4. An image processor that processes an image with an error diffusion method, comprising:

a binary processor that transforms a target pixel into binary data;

a binary error calculator that calculates an error between said target pixel and said binary data;

a propagation coefficient judger that stores a plurality of set of coefficients and selects one set of coefficients;

a propagation error operator that multiplies said error by said selected one set of coefficients, and outputs a result of said multiplication as a correction value;

an error adder that adds said correction value to a next peripheral pixel that is input into said binary processor, wherein said propagation coefficient judger substitutes a value of 0 for said selected one set of coefficients when a change of a black point and a white point exceeds a predetermined value, said propagation coefficient judger further storing four sets of coefficients, one sets of coefficient being chosen based on whether the target pixel exceeds a reference value, said propagation judger randomly selecting two sets of coefficients from said four sets of coefficients, said one sets of coefficients being chosen from said two sets of coefficients.

5. An image processor for processing an image with an error diffusion method, comprising:

a binary processor that transforms a target pixel into binary data;

a binary error calculator that calculates an error between said target pixel and said binary data;

a propagation coefficient judger that stores a plurality of set of coefficients and selects one set of coefficients;

a propagation error operator that multiplies said error by said selected one set of coefficients, and outputs a result of said multiplication as a correction value; and an error adder that adds said correction value to a next peripheral pixel that is input into said binary processor, wherein said propagation coefficient judger selects an alternative coefficient as a coefficient corresponding to a peripheral pixel, when a difference between the target pixel and the peripheral pixel exceeds a reference value.

6. The image processor of claim 5, wherein said propagation coefficient judger further selects said alternative coefficient as said coefficient corresponding to said peripheral pixel when an edge of the image exists between said target pixel and said peripheral pixel.

7. An image processor that processes an image with an error diffusion method, comprising:
- a binary processor that transforms a target pixel into binary data;
- a binary error calculator that calculates an error between said target pixel and said binary data;
- a propagation coefficient judger that outputs a set of coefficients;
- a propagation error operator that multiplies said error by said set of coefficients, and outputs a result of said multiplication as a correction value; and
- an error adder that adds said correction value to a next peripheral pixel that is input into said binary processor, wherein
- said propagation coefficient judger substitutes a value of 0 for said set of coefficients when a change of a black point and a white point exceeds a predetermined value, said propagation coefficient judger further judging that a change of a black point and a white point exceeds a predetermined value when an absolute value of a difference between the target pixel and a peripheral pixel is greater than a reference value.

8. An image processor for processing an image with an error diffusion method, comprising:
- a binary processor that transforms a target pixel into binary data;
- a binary error calculator that calculates an error between said target pixel and said binary data;
- a propagation coefficient judger section that outputs a set of coefficients;
- a propagation error operator that multiplies said error by said set of coefficients, and outputs a result of said multiplication as a correction value; and
- an error adder that adds said correction value to a next peripheral pixel that is input into said binary processor, wherein
- said propagation coefficient judger selects an alternative coefficient as a coefficient corresponding to a peripheral pixel when a difference between the target pixel and a peripheral pixel exceeds a reference value.

9. The image processor of claim 8,
- wherein said propagation coefficient judger further selects said alternative coefficient as said coefficient corresponding to said peripheral pixel when the edge of an image exists between the target pixel and the peripheral pixel.

10. An image processing method for processing an image with an error diffusion method, including a memory that stores a plurality of a set of coefficients, comprising:
- transforming a target pixel into binary data;
- calculating an error between the target pixel and the binary data;
- selecting one set of coefficients from a plurality of set of coefficients;
- multiplying the error by the selected one set of coefficients;
- outputting a result of the multiplication as a correction value;
- adding the correction value to a next peripheral pixel that is transformed into the binary data;
- judging that a change of a black point and a white point exceeds a predetermined value when an absolute value of a difference between the target pixel and a peripheral pixel is greater than a reference value; and
- substituting a value of 0 for the selected set of coefficients when the change of the black point and the white point exceeds the predetermined value.

11. An image processing method for processing an image with an error diffusion method, including a memory that stores a plurality of a set of coefficients, the method comprising:
- transforming a target pixel into binary data;
- calculating an error between the target pixel and the binary data;
- selecting one set of coefficients from a plurality of set of coefficients;
- multiplying the error by the selected one set of coefficients;
- outputting a result of the multiplication as a correction value;
- adding the correction value to a next peripheral pixel that is transformed into binary data; and
- substituting an alternative coefficient as a coefficient corresponding to a peripheral pixel when a difference between the target pixel and the peripheral pixel exceeds a reference value.

12. The image processing method of claim 11,
- further comprising setting the alternative coefficient as the coefficient corresponding to the peripheral pixel when an edge of the image exists between the target pixel and the peripheral pixel.

13. An image processing method for processing an image with an error diffusion method, comprising:
- transforming a target pixel into binary data;
- calculating an error between the target pixel and the binary data;
- outputting a set of coefficients;
- multiplying the error by the outputted set of coefficients;
- outputting a result of the multiplication as a correction value;
- adding the correction value to a peripheral pixel that is transformed into binary data;
- judging that a change of a black point and a white point exceeds a predetermined value when an absolute value of a difference between the target pixel and a peripheral pixel is greater than a reference value; and
- substituting a value of 0 for the outputted set of coefficients when the change of the black point and the white point exceeds the predetermined value.

14. An image processing method for processing an image with an error diffusion method, comprising:
- transforming a target pixel into binary data;
- calculating an error between the target pixel and the binary data;
- outputting a set of coefficients;
- multiplying the error by the outputted one set of coefficients;
- outputting a result of the multiplication as a correction value;
- adding the correction value to a next peripheral pixel that is transformed into binary data; and
- setting an alternative coefficient as a coefficient corresponding to a peripheral pixel when a difference between the target pixel and the peripheral pixel exceeds a reference value.

15. The image processing method of claim 14,
- further comprising setting the alternative coefficient as the coefficient corresponding to the peripheral pixel when an edge of the image exists between the target pixel and the peripheral pixel.

* * * * *